(12) United States Patent
Heo et al.

(10) Patent No.: US 7,447,516 B2
(45) Date of Patent: Nov. 4, 2008

(54) METHOD AND APPARATUS FOR DATA TRANSMISSION IN A MOBILE TELECOMMUNICATION SYSTEM SUPPORTING ENHANCED UPLINK SERVICE

(75) Inventors: Youn-Hyoung Heo, Gyeonggi-do (KR); Ju-Ho Lee, Suwon-si (KR); Joon-Young Cho, Suwon-si (KR); Young-Bum Kim, Seoul (KR); Yong-Jun Kwak, Dongcheon-dong (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 740 days.

(21) Appl. No.: 11/148,181

(22) Filed: Jun. 9, 2005

(65) Prior Publication Data

US 2006/0003787 A1  Jan. 5, 2006

(30) Foreign Application Priority Data

| Jun. 9, 2004 | (KR) | 10-2004-0042300 |
| Aug. 6, 2004 | (KR) | 10-2004-0062190 |
| Sep. 14, 2004 | (KR) | 10-2004-0073552 |
| Nov. 17, 2004 | (KR) | 10-2004-0093947 |
| Apr. 7, 2005 | (KR) | 10-2005-0029192 |

(51) Int. Cl.
*H04Q 7/20* (2006.01)

(52) U.S. Cl. ............ 455/522; 455/69; 375/225; 375/345

(58) Field of Classification Search ............ 455/522
See application file for complete search history.

(56) References Cited

U.S. PATENT DOCUMENTS 6,594,501 B2 *  7/2003  Black et al. ............ 455/522

(Continued)

FOREIGN PATENT DOCUMENTS

EP  1 237 296  9/2002

(Continued)

OTHER PUBLICATIONS

Anonymous, Nokia, System impacts of maximum power reduction due to the increased PAR with HS-DPCCH; TSG-RAN Joint Working Group 1 and 4 meeting Ad Hoc Espoo, Finland, Jan. 30, 2004.

(Continued)

*Primary Examiner*—Matthew D. Anderson
*Assistant Examiner*—Hai V Nguyen
(74) *Attorney, Agent, or Firm*—Roylance, Abrams, Berdo & Goodman L.L.P.

(57) ABSTRACT

A method and an apparatus for data transmission in a mobile telecommunication system supporting an enhanced uplink service are provided. A Transport Format Combination (TFC) selector determines TF information for data to be transmitted through a first data channel not supporting Hybrid Automatic Repeat reQuest (HARQ) and a second data channel supporting HARQ, and determines gain factors for the first and second data channel, and first and second control channel carrying control information for the first and second data channel. The gain factors are input to a physical channel transmission controller, and the physical channel transmission controller scales-down the gain factor for the second channel if total transmit power required for transmission of the channels exceeds the predetermined maximum allowed power. A gain scaler adjusts transmit powers of the channels using the scaled gain factor and gain factors for the first data channel, the first control channel and the second control channel.

28 Claims, 14 Drawing Sheets

U.S. PATENT DOCUMENTS

| | | | |
|---|---|---|---|
| 6,859,505 B2* | 2/2005 | Agami et al. | 375/345 |
| 6,930,981 B2* | 8/2005 | Gopalakrishnan et al. | 370/252 |
| 6,999,432 B2* | 2/2006 | Zhang et al. | 370/328 |
| 7,050,825 B2* | 5/2006 | Ginesi et al. | 455/522 |
| 7,062,288 B2* | 6/2006 | Raaf et al. | 455/522 |
| 7,079,489 B2* | 7/2006 | Massie et al. | 370/236 |
| 7,161,916 B2* | 1/2007 | Malladi et al. | 370/332 |
| 7,206,332 B2* | 4/2007 | Kwan et al. | 375/140 |
| 7,209,517 B2* | 4/2007 | Sindhushayana et al. | 375/225 |
| 7,304,971 B2* | 12/2007 | Balachandran et al. | 370/337 |
| 7,321,780 B2* | 1/2008 | Love et al. | 455/522 |
| 7,324,565 B2* | 1/2008 | Malkamaki | 370/535 |
| 7,339,949 B2* | 3/2008 | Suzuki et al. | 370/468 |
| 7,343,172 B2* | 3/2008 | Hwang | 455/522 |
| 7,376,209 B2* | 5/2008 | Namgoong et al. | 375/341 |
| 7,388,848 B2* | 6/2008 | Virtanen et al. | 370/329 |
| 2001/0053678 A1 | 12/2001 | Bonaccorso et al. | 455/137 |
| 2002/0054578 A1* | 5/2002 | Zhang et al. | 370/328 |
| 2002/0154612 A1* | 10/2002 | Massie et al. | 370/329 |
| 2003/0054852 A1* | 3/2003 | Ginesi et al. | 455/522 |
| 2003/0101274 A1* | 5/2003 | Yi et al. | 709/232 |
| 2003/0123470 A1* | 7/2003 | Kim et al. | 370/437 |
| 2003/0186718 A1* | 10/2003 | Raaf et al. | 455/522 |
| 2003/0228876 A1* | 12/2003 | Hwang | 455/522 |
| 2004/0009786 A1* | 1/2004 | Terry | 455/522 |
| 2004/0037224 A1* | 2/2004 | Choi et al. | 370/235 |
| 2004/0042492 A1* | 3/2004 | Suzuki et al. | 370/473 |
| 2004/0077370 A1* | 4/2004 | Dick et al. | 455/522 |
| 2004/0102205 A1 | 5/2004 | Yi et al. | |
| 2004/0190485 A1* | 9/2004 | Khan | 370/349 |
| 2004/0219920 A1* | 11/2004 | Love et al. | 455/442 |
| 2004/0228315 A1* | 11/2004 | Malkamaki | 370/342 |
| 2004/0258139 A1* | 12/2004 | Namgoog et al. | 375/147 |
| 2005/0002478 A1* | 1/2005 | Agami et al. | 375/345 |
| 2005/0013263 A1* | 1/2005 | Kim et al. | 370/320 |
| 2005/0041694 A1* | 2/2005 | Liu | 370/524 |
| 2005/0047366 A1* | 3/2005 | Ghosh et al. | 370/329 |
| 2005/0117559 A1* | 6/2005 | Malladi et al. | 370/342 |
| 2005/0207359 A1* | 9/2005 | Hwang et al. | 370/278 |
| 2005/0213536 A1* | 9/2005 | Virtanen et al. | 370/329 |
| 2005/0237932 A1* | 10/2005 | Liu | 370/230 |
| 2005/0250497 A1* | 11/2005 | Ghosh et al. | 455/436 |
| 2005/0250511 A1* | 11/2005 | Xiao et al. | 455/453 |
| 2006/0003794 A1* | 1/2006 | Chung et al. | 455/522 |
| 2006/0023687 A1* | 2/2006 | Cheng et al. | 370/342 |
| 2006/0264220 A1* | 11/2006 | Chen et al. | 455/454 |
| 2007/0091852 A1* | 4/2007 | Malladi et al. | 370/332 |
| 2007/0168831 A1* | 7/2007 | Kim et al. | 714/755 |
| 2007/0189223 A1* | 8/2007 | Hwang | 370/331 |
| 2008/0062932 A1* | 3/2008 | Hwang | 370/331 |
| 2008/0090602 A1* | 4/2008 | Holma et al. | 455/522 |

FOREIGN PATENT DOCUMENTS

| | | |
|---|---|---|
| JP | 2002-217828 | 8/2002 |
| JP | 2004-064797 | 2/2004 |
| JP | 2004-173017 | 6/2004 |
| JP | 2005-167963 | 6/2005 |
| JP | 2005-530458 | 10/2005 |
| JP | 2005-311882 | 11/2005 |
| JP | 2007-124682 | 5/2007 |
| JP | 2007-531432 | 11/2007 |
| JP | 2007-531433 | 11/2007 |
| WO | WO 03/052963 | 6/2003 |
| WO | WO 2004/034608 | 4/2004 |

OTHER PUBLICATIONS

Anonymous, Panasonic, LS on minimum power limit, 3GPP TSG RAN WG1 Meeting #36, Malaga, Spain, Feb. 16-20, 2004.

Anonymous, Siemens, HARQ Retransmission Power for Enhanced Uplink DCH, TSG-RAN Working Group 1 #36, Malaga, Spain, Feb. 16-20, 2004.

Anonymous, Siemens, Performance of the HARQ Retransmission Power Offset Scheme for 10ms TTI, TSG Working Group 1 #37, Montreal, Canada, May 10-14, 2004.

3rd Generation Partnership Project; Technical Specification Group Radio access Network; Feasibility Study for Enhanced Uplink for UTRA FDD (Release 6) 3GPP TR 25.896 V6.0.0, XX, XX, Mar. 2004 pp. 1-91, XP002342958.

* cited by examiner

METHOD AND APPARATUS FOR DATA TRANSMISSION IN A MOBILE TELECOMMUNICATION SYSTEM SUPPORTING ENHANCED UPLINK SERVICE

PRIORITY

This application claims the benefit under 35 U.S.C. 119(a) of applications entitled "Method and Apparatus for Data Transmission in Mobile Telecommunication System Supporting Enhanced Uplink Service" filed in the Korean Industrial Property Office on Jun. 9, 2004, Aug. 6, 2004, Sep. 14, 2004, Nov. 17, 2004 and Apr. 7, 2005 and assigned Ser. Nos. 2004-42300, 2004-62190, 2004-73552, 2004-93947 and 2005-29192, respectively, the entire contents of which are hereby incorporated by reference.

BACKGROUND OF THE INVENTION

1. Field of the Invention

The present invention relates to a mobile telecommunication system supporting an enhanced uplink service. More particularly, the present invention relates to a power setting method and a power setting apparatus for transmitting data based on characteristics of uplink channels.

2. Description of the Related Art

An Enhanced-uplink Dedicated Channel (hereinafter referred to as 'E-DCH') has been proposed to improve the performance of uplink packet transmission in a Wideband Code Division Multiple Access (hereinafter referred to as 'WCDMA') system. Along with the introduction of the E-DCH, a plan is under discussion to use Adaptive Modulation and Coding (hereinafter referred to as 'AMC'), Hybrid Automatic Retransmission Request (hereinafter referred to as 'HARQ') and Node B control scheduling methods for an uplink.

FIG. 1 is a basic conceptual view illustrating a situation where the E-DCH is used.

Referring to FIG. 1, a Node B 100 supports the E-DCH and detects channel states of User Equipments (hereinafter referred to as 'UE') 101, 102, 103, 104 using the E-DCH to perform scheduling suitable for the respective UEs via paths 111, 112, 113 and 114, respectively. That is, the Node B 100 assigns a low data rate to the UE 104 at a remote location and assigns a high data rate to the UE 101 at a close location while maintaining a noise rise value below a threshold noise rise value.

FIG. 2 illustrates basic transmission/reception procedures of the E-DCH.

Referring to FIG. 2, in step 203, a Node B 200 and a UE 202 establish the E-DCH. The establishment of the E-DCH includes a procedure of delivering messages through a dedicated transport channel.

In step 204, the UE 202 informs the Node B 200 of scheduling information. The scheduling information may be information on the UE's transmit power, from which uplink channel information can be derived, or include information on extra power, with which the UE can transmit data, and the amount of data to be transmitted, which is stored in a buffer of the UE.

In step 211, the Node B 200 performs scheduling for several UEs including the UE 202 while monitoring the scheduling information received from the respective UEs.

When the Node B 201 determines to permit uplink packet transmission to the UE 202, it transmits scheduling assignment information to the UE 202 in step 205. Here, the scheduling assignment information may include an allowed rate, allowed timing, KEEP/UP/DOWN for an uplink and the like.

In step 212, the UE 202 determines a Transport Format (hereinafter referred to as 'TF') of the E-DCH to be transmitted over the uplink using the scheduling assignment information.

In steps 206 and 207, the UE 202 transmits a Transport Format Resource Indicator (TFRI), information related to the determined TF, and uplink packet data (UL packet data) including E-DCH data to the Node B 201.

In step 213, the Node B 200 determines whether the information relating to the TF and the E-DCH data have errors. At this time, the Node B determines the information to be a Negative Acknowledge (hereinafter referred to as 'NACK') if there is any error in the information and determines the information to be a Positive Acknowledge (hereinafter referred to as 'ACK') if there is no error in the information.

In step 208, the Node B transmits ACK/NACK information to the UE 202 through an ACK/NACK channel according to the result judged in step 213. At this time, the UE 202 transmits new data if it receives the ACK and retransmits the previous data if it receives the NACK.

FIG. 3 illustrates an example of data transmission through the E-DCH in the WCDMA system.

As shown in FIG. 3, if data 316 to be transmitted, including video telephony, uploading of multimedia mail, games, etc., occurs, a UE 317 spreads the data 316 using a code assigned to a physical channel 318 and then transmits it to a Node B 319.

The E-DCH is mapped to and transmitted through an Enhanced Dedicated Physical Data Channel (hereinafter referred to as 'E-DPDCH') using a code multiplexing scheme. The E-DPDCH may coexist with a DPDCH to which a DCH, a typical uplink transmission channel of a UE, is mapped, a Dedicated Physical Control Channel (hereinafter referred to as 'DPCCH') which carries control information related to the DPDCH, and an Enhanced DPCCH (hereinafter referred to as 'E-DPCCH') which carries control information related to the E-DPDCH. A UE sets transmit powers of the respective physical channels according to the current maximum transmit power which is allowed to the UE. The maximum transmit power may be determined by the transmission capability of a power amplifier of the UE and a minimum value of a transmit power set by a network. At this time, the transmit powers of the physical channels other than the DPCCH are determined according to power ratios relative to the DPCCH.

FIG. 4 is a block diagram illustrating a structure of a conventional physical layer transmission stage of a UE.

Referring to FIG. 4, the UE 317 encodes data to be transmitted through a data channel via a coding block 305. Control information necessary for the reception of the data channel is also generated separately for a control channel. Here, the data channel represents the DPDCH or the E-DPDCH and the control channel represents the DPCCH or the E-DPCCH.

The control information and the encoded data are modulated by modulators 300, 306, respectively. The modulated control information and data are spread by spreaders 301, 307 using channelization codes of the data channel and the control channel, that is, $C_c$ and $C_d$, respectively and then are transmitted to gain scalers 302, 308, respectively. The spread control information and data are multiplied by gain factors given to the control channel and the data channel, that is, $\beta_c$, $\beta_d$ in the gain scalers 302, 308, respectively and then are multiplexed by a multiplexer 303. The multiplexed data is input to a scrambler 304 to be scrambled by a scrambling code $S_{dpch,n}$ of the DPCH and then is converted into a Radio Frequency (RF) signal through an RF unit 309 to be wirelessly transmitted by an antenna.

The gain factor is a value for setting powers of the relevant physical channel based on the DPCCH which is subjected to power control and is set according to data sizes and services types of the respective physical channels. The gain factor, one of the components constituting a TF, is set according to a Transport Format Combination (hereinafter referred to as 'TFC'). The gain factor is determined by a TFC selection part of an upper layer, which in turn determines a format of transmission channel data, and is transmitted to the physical layer. The physical channel sets the transmit power of each physical channel according to the gain factor. At this time, the UE scales the gain factor of each physical channel such that it does not exceed a maximum allowed power.

If only a TFC satisfying an allowable power level is selected through the TFC selection in a case of desiring to further use the E-DCH in addition to the transmission channels defined in the conventional system, the gain factors of all the physical channels are equally scaled when total transmit power exceeds the maximum allowed power. The E-DCH supports a HARQ technique in which demodulation at a reception stage is possible only by always using the same transmission format as that of the initial transmission even during retransmission. Thus, the TFC selection part always selects the same TFC as that of the initial transmission irrespective of allowable TFCs when E-DCH data is retransmitted. In general, the transmit power during retransmission is set to the same level as that of the initial transmission.

In some situations, there may be a case where DCH data does not exist at the initial transmission of the E-DCH and the DCH data occurs at retransmission. There may also be a situation where the E-DCH data must be retransmitted under the condition of a fixed TF and fixed transmit power of the DCH when a Transmission Time Interval (hereinafter referred to as 'TTI') of the E-DCH is set to less than the minimum TTI of the DCH. In such situations, if a UE uses the same power as that of the initial transmission for retransmission of the E-DCH data, it is likely to result in total transmit power exceeding the maximum allowed power. Although it is possible to transmit all the physical channels within the maximum allowed power by equally scaling down powers of all the physical channels while maintaining their power ratios, transmission qualities of the respective physical channels may not be ensured.

FIG. 5 is a diagram illustrating an example of problems occurring during conventional retransmission of E-DCH data.

As shown in the drawing, a UE initially transmits E-DCH data through an E-DPDCH in time slot T1. Since there is no DCH data in time slot T1, total transmit power 401 does not exceed the maximum allowed power ($P_{max}$) 407. However, in time slot T2 in which retransmission of the E-DCH data occurs, DCH data is transmitted through a DPDCH and thus the total transmit power 402 including those of the E-DPDCH and the DPDCH exceeds the maximum allowed power ($P_{max}$) 407. Thus, as designated by reference numeral 405, the transmit powers of the E-DPDCH, the DPDCH and a DPCCH are equally scaled down. As a result of this, after the transmit powers of the physical channels have been scaled down, the total transmit power 404 does not exceed the maximum allowed power 407 in time slot T3.

However, qualities of all the E-DPDCH, the DPDCH and the DPCCH at a reception stage are all lowered in time slot T3 because such physical channels are transmitted using less power than those in time slot T2. In particular, if the transmit powers of all the physical channels are always equally scaled in a case where the DCH and the E-DCH have different priorities from each other, transmission quality of the DCH or the E-DCH may deteriorate due to retransmission. To give an example, even if the DCH is used for a voice call having higher priority, DCH data may be transmitted with a very low level of power in some time slots within one TTI due to retransmission of the E-DCH data having lower priority, which results in quality deterioration of the voice call.

Therefore, in a case where an E-DCH supporting HARQ exists, there is a strong desire to provide a technique for efficiently controlling the transmit power of each physical channel when the total transmit power of a UE exceeds the maximum allowed transmit power.

SUMMARY OF THE INVENTION

Accordingly, the present invention has been made to solve at least the above-mentioned problems occurring in the prior art, and an object of the present invention is to provide a method and an apparatus for efficiently controlling transmit power of each physical channel when total transmit power of a user equipment (UE) exceeds the maximum allowed power in a case of supporting a packet service through uplink channels.

The present invention provides a method and an apparatus for adjusting power of a specific transmission channel when enhanced uplink dedicated channel (E-DCH) data is retransmitted.

The present invention also provides a method and an apparatus for adjusting transmit powers of an E-DCH and a uplink dedicated channel (DCH) differently from each other according to transmission conditions and priorities of the channels.

In order to accomplish the above-mentioned object, in accordance with one aspect of the present invention, there is provided a method for transmitting data of a first channel not supporting Hybrid Automatic Repeat reQuest (HARQ) and a second channel supporting the HARQ in a mobile telecommunication system which supports an enhanced uplink service. The method comprising the steps of setting transmit power factors for the channels and determining if total transmit power required for transmission of the channels exceeds the maximum allowed power; scaling-down the transmit power factor for the second channel if the total transmit power exceeds the maximum allowed power; and transmitting data through the first and second channels using the scaled-down transmit power factor for the second and the transmit power factor for the first channel.

In accordance with another aspect of the present invention, there is provided an apparatus for transmitting data of a first channel not supporting HARQ and a second channel supporting the HARQ in a mobile telecommunication system which supports an enhanced uplink service. The apparatus comprising a controller for setting transmit power factors for the channels, determining if total transmit power required for transmission of the channels exceeds the maximum allowed power, and scaling-down the transmit power factor for the second channel if the total transmit power exceeds the maximum allowed power; first and second channel generators for generating first and second data frames by performing channel-coding and modulation of the first and second channel data; and a gain scaling unit for adjusting the transmit powers of the first and second channels, with which the data frames of the first and second channels is transmitted, using the scaled transmit power factor for the second channel and the transmit power factor for the first channel.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Hereinafter, embodiments of the present invention will be described with reference to the accompanying drawings. Also, in the following description, a detailed description of known functions and configurations incorporated herein will be omitted for conciseness.

The present invention to be described below ensures transmission qualities of physical channels except an Enhanced Dedicated Physical Data Channel (E-DPDCH), to which an enhanced uplink dedicated channel (E-DCH) is mapped, by scaling down transmit powers of the E-DPDCH when the total transmit power of a user equipment (UE) supporting the E-DCH exceeds its maximum allowed power.

Figure 1:
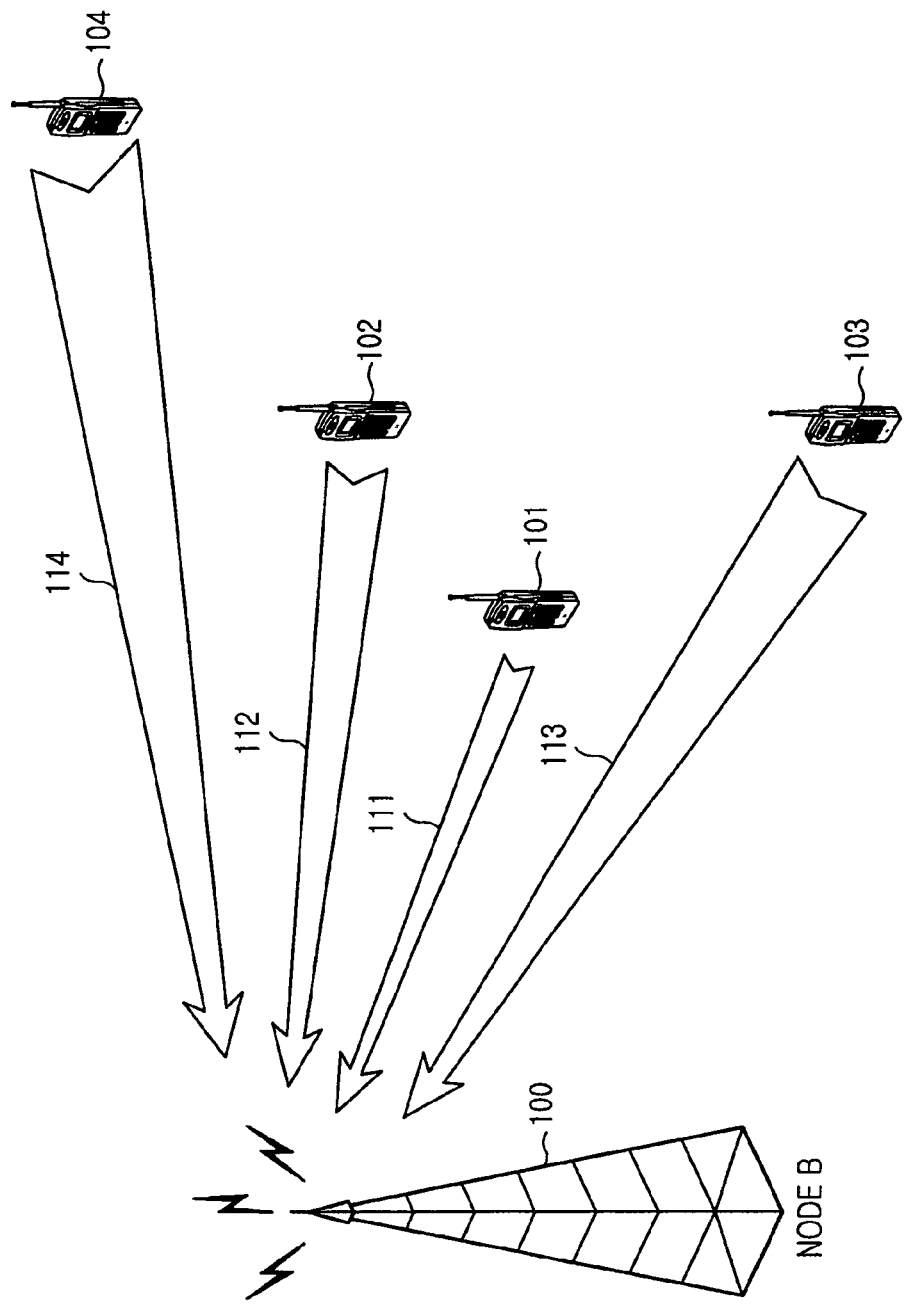
FIG. 1 is a basic conceptual view illustrating a situation where an enhanced uplink dedicated channel (E-DCH) is used for conventional data transmission.
Figure 2:
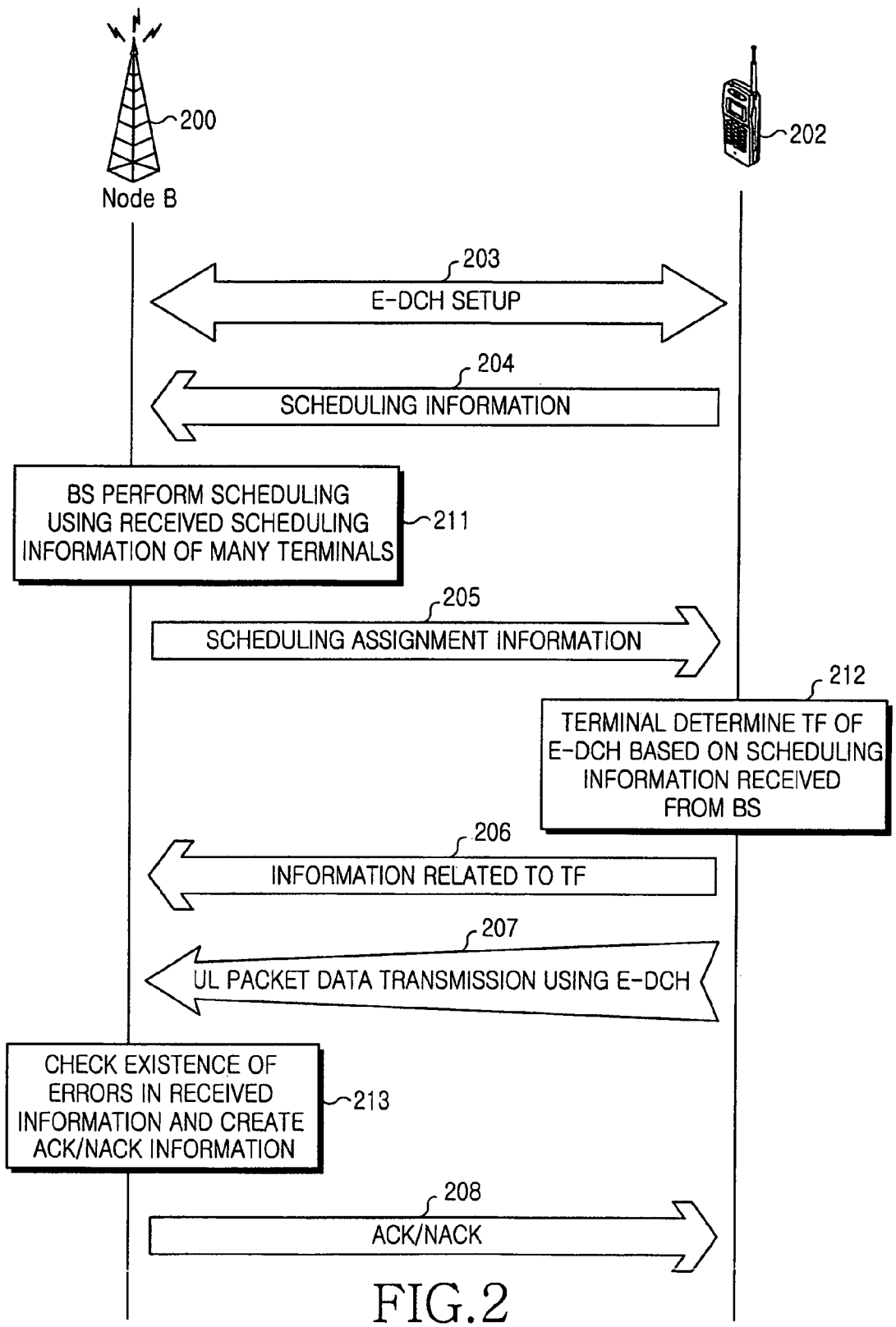
FIG. 2 is a view illustrating basic transmission and reception procedures of the conventional E-DCH.
Figure 3:
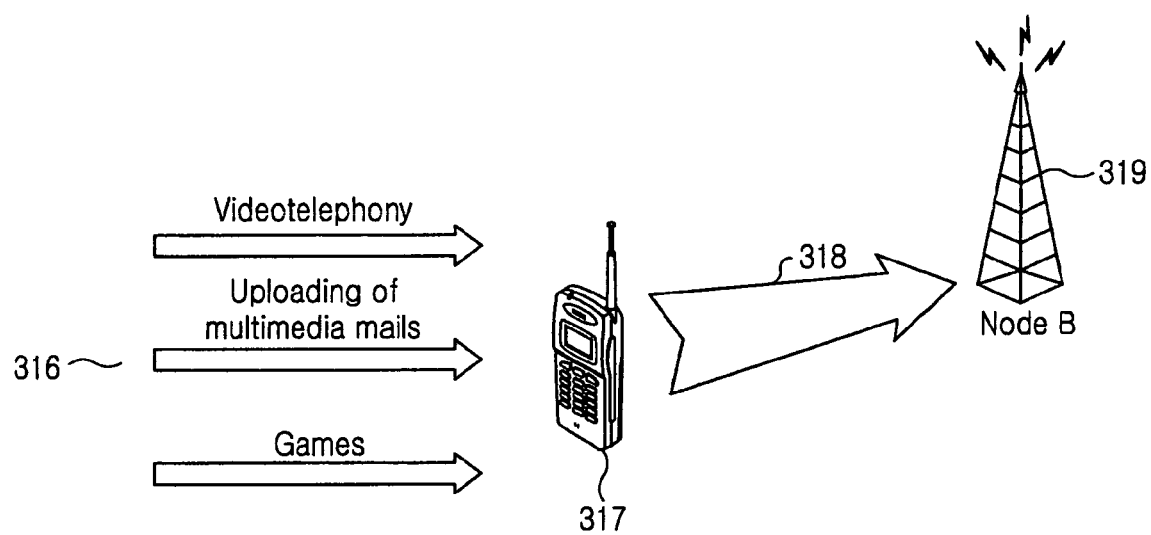
FIG. 3 is a view illustrating an example of data transmission through the conventional E-DCH in a WCDMA system.
Figure 4:
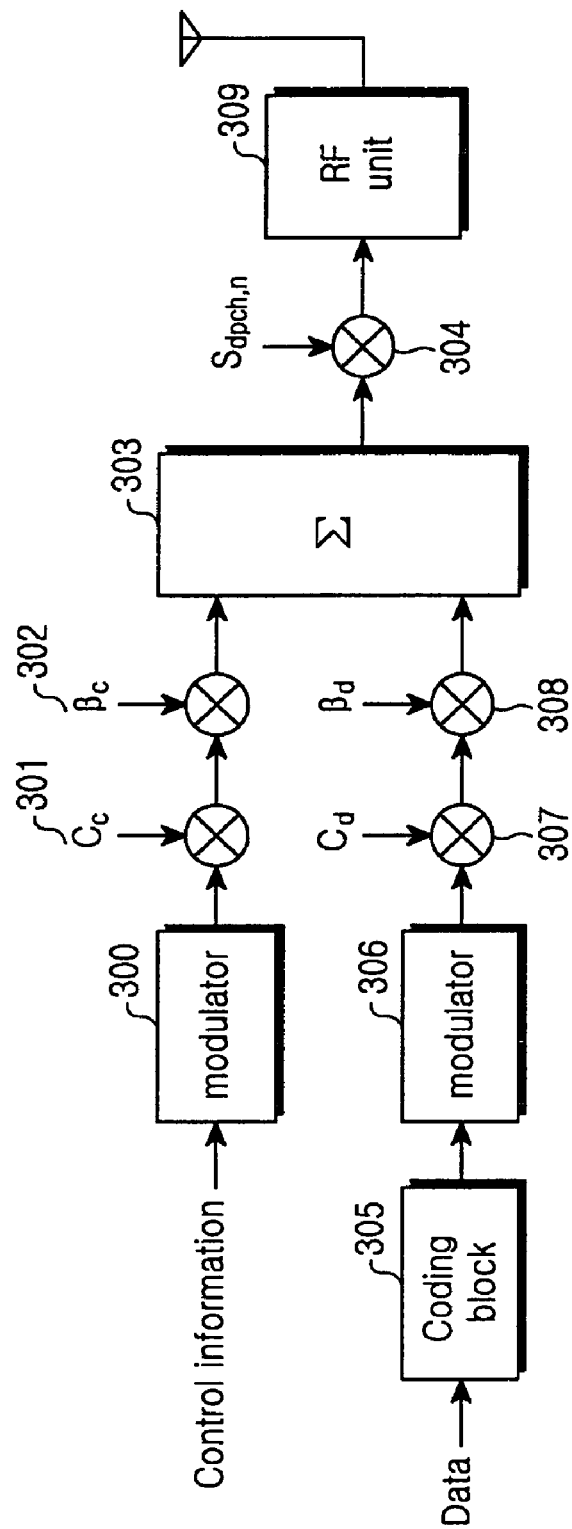
FIG. 4 is a block diagram illustrating a structure of a transmission stage of a conventional user equipment (UE)
Figure 5:
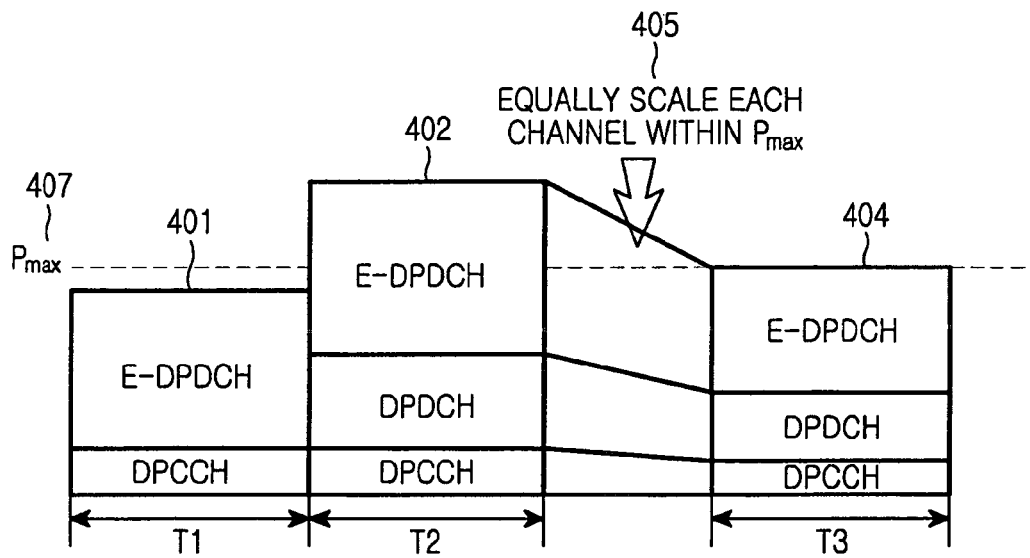
FIG. 5 is a diagram illustrating an example of problems occurring during retransmission of conventional E-DCH data.
Figure 6:
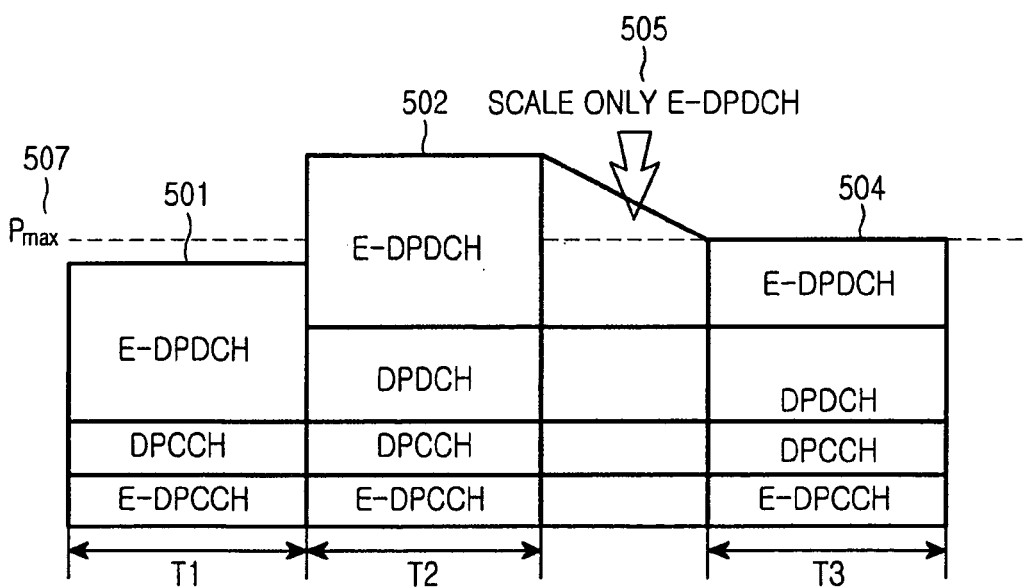
FIG. 6 is a diagram illustrating an example of changing transmit power of a UE in accordance with an embodiment of the present invention.

FIG. 6 illustrates an example of changing transmit powers of a UE in accordance with an embodiment of the present invention.

Referring to FIG. 6, a UE initially transmits E-DCH data through an E-DPDCH in time slot T1. Since there is no DCH data in time slot T1, total transmit power 501 does not exceed the maximum allowed power ($P_{max}$) 507. However, in time slot T2 in which retransmission of the E-DCH data occurs, DCH data is transmitted through a DPDCH and thus the total transmit power 502 exceeds the maximum allowed power 507. At this time, as designated by reference numeral 505, only the transmit power of the E-DPDCH is scaled down. As a result of this, after the transmit power of the E-DPDCH has been scaled down, the total transmit power 504 does not exceed the maximum allowed power 507 in time slot T3 and the power levels of the other channels, that is, an enhanced dedicated physical control channel (E-DPCCH), a dedicated physical data channel (DPDCH) and a dedicated physical data channel DPCCH are maintained identically to those in time slot T2. Thus, a problem of reduction in a power level of the DCH due to the E-DCH can be avoided and the DCH data can be transmitted stably.

The transmit powers of the E-DCH and the DCH are controlled by varying predetermined transmit power factors for a physical channel to which the relevant channel is mapped. In a WCDMA system, the transmit power factor signifies a gain factor specific to each channel. FIG. 6 illustrates a case where the DCH data transmission is preferentially ensured by scaling the gain factor of the E-DCH. In another case where the E-DCH has priority over the DCH, it is also possible to scale the transmit power of the DCH. The following description will be given on the assumption that the transmit power is scaled using gain factors of the respective channels. Hereinafter, various embodiments of the present invention will be described.

EXAMPLE 1

In a first embodiment of the present invention, total transmit power is scaled by recalculating a gain factor of a specific channel, that is, an E-DPDCH such that the total transmit power does not exceed the maximum allowed power in an upper layer of a UE. According to this first embodiment of the present invention, when both E-DCH data and DCH data exist, the UE checks if the E-DCH data is retransmitted. If a result of the checking shows retransmission of the E-DCH data, a gain factor of the E-DPDCH to which the E-DCH is mapped is reset at the time of the transmission.

Figure 7:
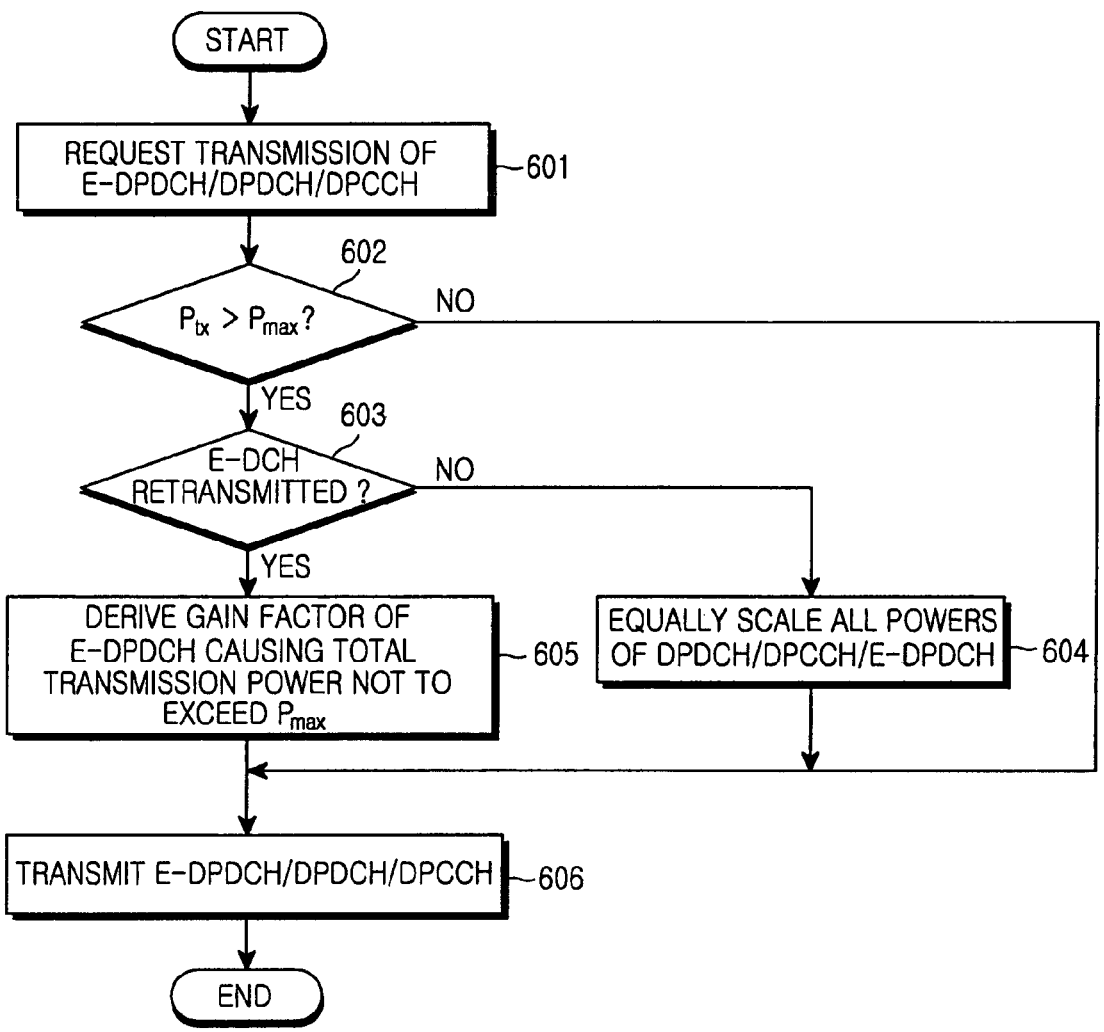
FIG. 7 is a flowchart illustrating procedures of setting transmit powers of physical layers of a UE in accordance with a first embodiment of the present invention.

FIG. 7 illustrates procedures of setting transmit powers of physical layers of a UE in accordance with the first embodiment of the present invention.

Referring to FIG. 7, in step 601, a UE detects a transmission request of E-DPDCH/DPDCH/DPCCH data, including gain factors of the respective channels. In step 602, the UE having detected the transmission request estimates total transmit power $P_{tx}$ using the gain factors of the channels to be transmitted. That is, the UE measures its transmit power in each time slot in order to check its power condition. The UEs estimate the total transmit power $P_{tx}$ of channels to be transmitted based on the measured transmit power and using given gain factors required for the next transmission.

The UE checks if the total transmit power $P_{tx}$ exceeds the maximum allowed power $P_{max}$ in step 602. If the total transmit power does not exceed the maximum allowed power, the UE proceeds to step 606 to transmit the data through each relevant channel.

If the total transmit power exceeds the maximum allowed power, the UE checks whether E-DCH data to be transmitted through the E-DPDCH corresponds to initial transmission data or retransmission data. If the E-DCH data is determined to be initially transmitted, the UE equally scales powers of all the channels while keeping power ratios between the channels constant in step 604. In another embodiment, the UE may defer transmission of a channel having lower priority according to priorities of the DCH-data and the E-DCH data and select gain factors for the other channels in a conventional manner or may set transmit power for an channel having higher priority before anything else and then set powers for the other channels such that the total transmit power does not exceed the maximum allowed power.

If the E-DCH data is to be retransmitted, the UE derives again the gain factor of the E-DPDCH such that the total transmit power does not exceed the maximum allowed power and scales only powers of the E-DPDCH in step 605. A method for deriving the gain factor will be described later in detail. After the completion of step 604 or 605, the UE proceeds to step 606 to transmit the relevant data through the channels using the gain factor of the E-DPDCH and the gain factors of the other channels.

In FIG. 7, although it is described that the procedure of checking if the total transmit power exceeds the maximum allowed power (step 602) precedes the procedure of checking if the E-DCH data is initial transmission data or retransmission data (step 603), the order of steps 602 and 603 may be exchanged with each other.

Since a case where the total transmit power exceeds the maximum allowed power occurs during only one TTI, the UE performs the procedures shown in FIG. 7 TTI by TTI. When the total transmit power continually increases and finally exceeds the maximum allowed power by virtue of power control during actual transmission, powers of all the channels are equally scaled in a conventional manner while their power ratios are maintained.

The gain factor of the E-DPDCH, which causes the total transmit power not to exceed the maximum allowed power, can be derived from the following equation (Equation (1)). This means that retransmit power of the E-DCH is reduced by a certain ratio relative to the previous transmit power within a range not exceeding the maximum allowed power.

$$\beta_e = \mathrm{sqrt}(P_{max} \times (\beta_c^2 + \beta_d^2 + \beta_{e,ori}^2) - P_{tx,ori} \times (\beta_c^2 + \beta_d^2))/P_{tx,ori} \quad (1)$$

wherein $\beta_{e,ori}$, $\beta_c$ and $\beta_d$ denote gain factors of the E-DPDCH/DPCCH/DPDCH determined by a TFC selection part, $\beta_e$ denotes a new gain factor of the E-DPDCH causing total transmit power not to exceed the maximum allowed power, $P_{tx,ori}$ denotes total transmit power estimated using $\beta_{e,ori}$, $\beta_c$ and $\beta_d$ and subscript 'ori' is intended to represent that $\beta_{e,ori}$, a prior value to scaling, is applied to the estimation, $P_{max}$ denotes a maximum transmit power allowed to the UE (that is, the maximum allowed power) and sqrt represents square root.

Equation (1) is an equation for deriving a new gain factor $\beta_e$ by which power of the E-DPDCH is reduced while transmit powers of the DPDCH and the DPCCH are kept constant when the total transmit power exceeds the maximum allowed power. $\beta_e$ derived from Equation (1) becomes smaller than $\beta_{e,ori}$. That is, the UE can transmit the E-DPDCH within the total transmit power not exceeding the maximum allowed power. If $\beta_e$ calculated by Equation (1) is an imaginary value, the transmit power of the E-DPDCH is regarded as '0'. When $\beta_e$ calculated by Equation (1) is smaller than a predetermined minimum value, the UE does not perform retransmission of the E-DCH data in the current time slot, but may try to retransmit the E-DCH data in a next time slot.

In an environment where the E-DPCCH is transported only when the E-DPDCH exists, it is possible not to transmit the E-DPCCH when the E-DPDCH is not retransmitted. Also, in a case where information representing that a power ratio of the E-DPDCH has been scaled is required in view of a receiver structure of a Node B scheduler, the UE may signal information indicating that the power ratio of the E-DPDCH has been scaled to the Node B by physical layer signaling.

In an E-DCH environment, the transmit power of the E-DCH is scaled through the gain factor of the E-DPDCH which is set according to a TF. In addition, the transmit power having been scaled through the gain factor may be further scaled if necessary. As an example, the transmit power of the E-DCH to be serviced is controlled according to a required Quality of Service (QoS). Here, one bit, which represents an increase of the transmit power when it increases, is included in E-DCH control information and is signaled to a Node B. As another example, when the amount of E-DCH data to be transmitted is transmitted through the E-DCH, a UE increases the transmit power of the E-DCH. At this time, one bit for representing the increase of the transmit power is included in E-DCH control information and is signaled to a Node B through an E-DPCCH.

Hereinafter, a description will be given for a method signaling information representing that transmit power of an E-DPDCH has been scaled in a physical layer.

A 1-bit indicator indicating that the transmit power of the E-DPDCH has been scaled is assigned to the E-DPDCH. Types of control information comprising such a 1-bit indicator and bit configurations according to the respective control information are shown below in Table 1.

TABLE 1

| Control information | No. of bits |
|---|---|
| TFI | 5 |
| Power de-boosting indicator | 1 |
| Power boosting indicator | 1 |
| MAC-e signaling indicator | 1 |
| NDI | 2 |

A TFI (TF Index) is an index indicating a TF of an E-DCH which is transmitted in a corresponding TTI, a power de-boosting indicator is an identifier indicating that transmit power of the E-DCH has been scaled down in accordance with the first embodiment of the present invention, a power boosting indicator is an identifier indicating that the transmit power of the E-DCH has been scaled up in consideration of QoS, a MAC-e signaling indicator is an identifier indicating that the transmit power of the E-DCH has been scaled up in order to transmit buffer status information, and an NDI (New Data Indicator) is an identifier for informing initial transmission packet as HARQ information. In this way, the E-DPDCH uses bits which are discriminated according to control information and are assigned thereto.

Here, since the power de-boosting indicator, the power boosting indicator and the MAC-e signaling indicator are related directly to the increase/decrease of transmit power and/or normal transmission, a 2-bit indicator is used in another embodiment of control information as shown below in Table 2.

TABLE 2

| Control information | No. of bits |
|---|---|
| TFI | 5 |
| Power indicator | 2 |
| NDI | 2 |

Table 2 shows an example of constructing physical layer signaling information which indicates scaling of the E-DCH using the 2-bit power indicator. At this time, the Power indicator represents the following contents shown in Table 3.

TABLE 3

| Power indicator | Description |
| --- | --- |
| 00 | Normal power |
| 01 | Power de-boosting |
| 10 | Power boosting |
| 11 | MAC-e signaling |

Since the MAC-e signaling generally signifies the increase of transmit power of the E-DCH, the power indicator may represent the following contents shown in Table 4 in another embodiment.

TABLE 4

| Power indicator | Content |
| --- | --- |
| 00 | Normal power |
| 01 | Power de-boosting |
| 10 | Power boosting and MAC-e signaling |
| 11 | Reserved case |

Hereinafter, a description will be given for a transmitter unit of a UE for realizing the first embodiment with reference to FIG. 8.

Figure 8:
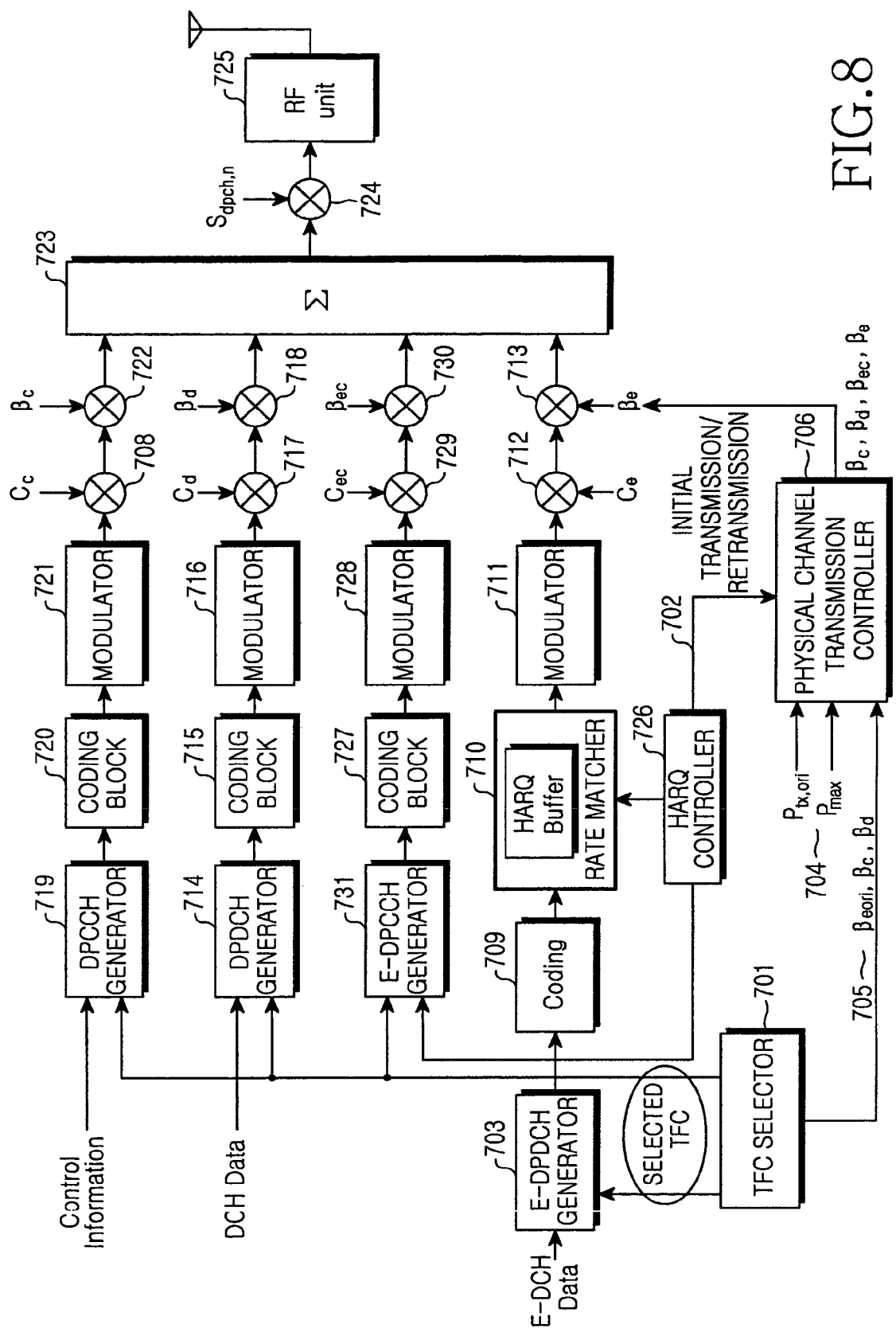
FIG. 8 is a block diagram illustrating a transmitter unit of a UE in accordance with the first embodiment of the present invention.

Referring to FIG. 8, a UE uses a DPCCH, a DPDCH, an E-DPCCH and an E-DPDCH as uplink channels. A TFC selector 701 sets corresponding gain factors in conformity with requirements in terms of data rates and transmission qualities of the channels. A HARQ controller 726 transmits information for rate matching of data, which is encoded compatibly with channel characteristics of an E-DCH, to a rate matcher 710 comprising a HARQ buffer and transmits HARQ information 702 for setting gain factors for initial transmission and retransmission to a physical channel transmission controller 706.

The physical channel transmission controller 706 sets parameters necessary for physical channel transmission. Specifically, the physical channel transmission controller 706 resets a new gain factor $\beta_e$ with information 702 representing initial transmission/retransmission received from the HARQ controller 726, power parameters $P_{max}$, $P_{tx,ori}$ 704, and gain factors $\beta_{e,ori}$, $\beta_c$, $\beta_d$ 705 received from the TFC selector 701 according to the procedures shown in FIG. 6.

If a DCH, that is, control information for the DPDCH is received, a DPCCH generator 719 generates the control information into a DPCCH frame, and a coding block 720 encodes the DPCCH frame. The encoded data is modulated by a modulator 721, is spread by a channelization code $C_c$ of the DPCCH in a spreader 708, is multiplied by a gain factor $\beta_c$ of the DPCCH in a gain scaler 722, and then is transmitted to a multiplexer 723.

If data to be transmitted through the DCH and the E-DCH is received, an E-DPDCH generator 703 and a DPDCH generator 714 generate the data into a DCH frame and an E-DCH frame according to TFC information selected TF by TF in the TFC selector 701, respectively, and coding blocks 709, 715 encode the DCH frame and the E-DCH frame, respectively. The DPDCH data encoded in the coding block 715 is modulated by a modulator 716, is spread by a channelization code $C_d$ of the DPDCH in a spreader 717, is multiplied by a gain factor $\beta_d$ of the DPDCH in a gain scaler 718, and then is transmitted to the multiplexer 723.

The E-DPDCH frame generated in the E-DPDCH generator 703 is also encoded in a coding block 709 and then is transmitted to the rate matcher 710. The rate matcher 710 performs rate matching of the encoded E-DPDCH data under the control of the HARQ controller 726. The rate-matched data is modulated by a modulator 711, is spread by a channelization code $C_e$ of the E-DPDCH in a spreader 712, is multiplied by the gain factor $\beta_e$ of the DPCCH reset by the physical channel transmission controller 706 in a gain scaler 713, and then is transmitted to the multiplexer 723.

If control information for the E-DCH including TFC information selected for the E-DPDCH (that is, control information for the E-DPDCH) is received, an E-DPCCH generator 731 generates an E-DPCCH frame including the control information for the E-DCH. The E-DPCCH frame is encoded in a coding block 727, is modulated by a modulator 728, is spread by a channelization code $C_{ec}$ of the E-DPCCH in a spreader 729, is multiplied by a gain factor $\beta_{ec}$ of the E-DPCCH in a gain scaler 730, and then is transmitted to the multiplexer 723.

The data from the gain scalers 722, 718, 713, 730 are multiplexed in the multiplexer 723, is input into a scrambler 724 to be scrambled by a scrambling code $S_{dpch,n}$, and then is RF-converted and transmitted by an RF unit 725.

EXAMPLE 2

In a second embodiment of the present invention, if total transmit power exceeds the maximum allowed power in a case where E-DCH data is retransmitted, the total transmit power is scaled by reducing a gain factor of the E-DCH by a predetermined gain offset.

According to this second embodiment of the present invention, a new gain factor of an E-DPDCH is calculated by the following equation (Equation (2)) when the total transmit power exceeds the maximum allowed power.

$$\beta_e = \beta_{e,ori} \times 10^{(\Delta_{offset}/10)}$$

wherein $\Delta_{offset}$ denotes the gain offset which can be set through signaling of an upper layer.

Figure 9:
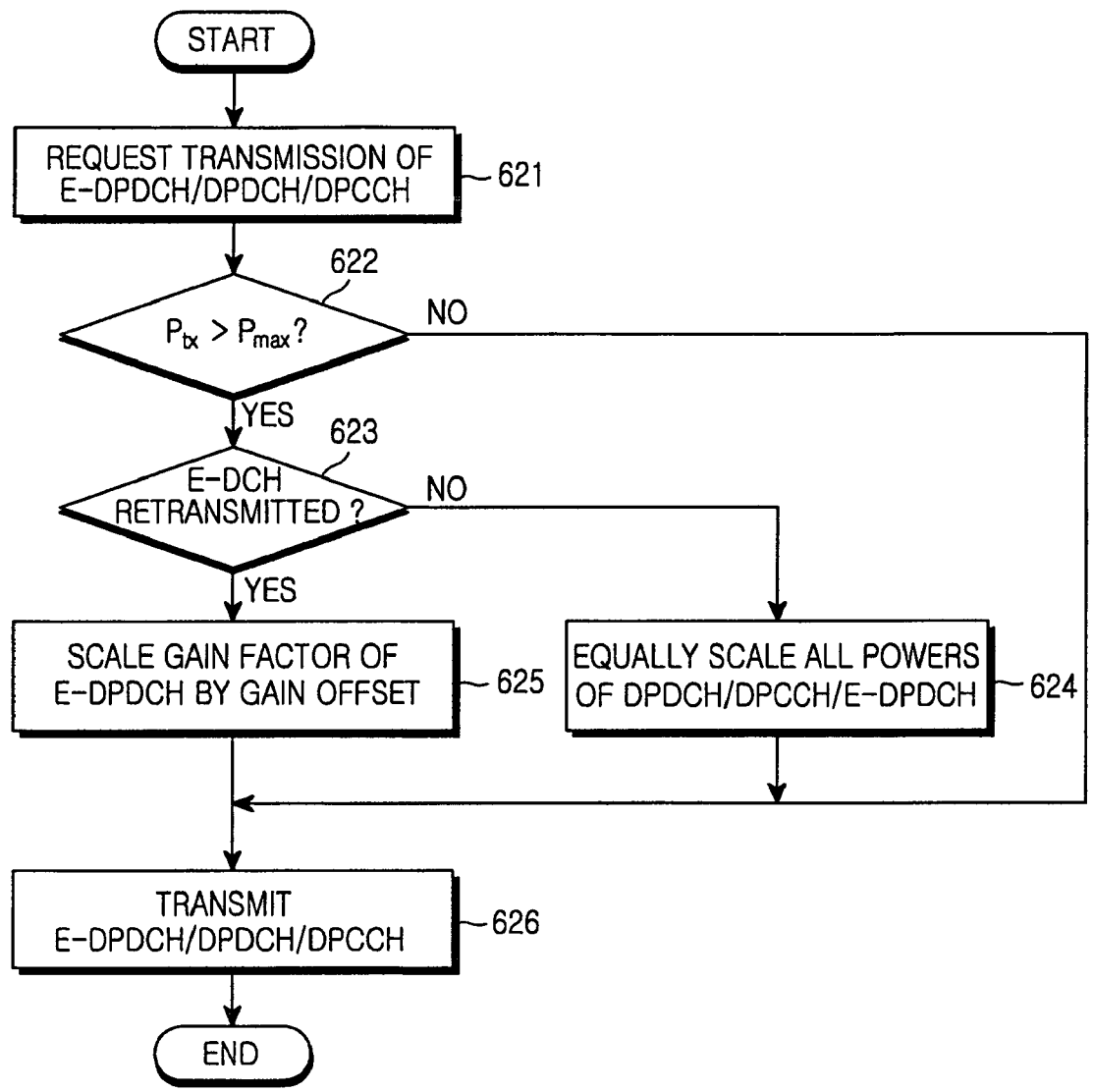
FIG. 9 is a flowchart illustrating procedures of setting transmit powers of physical layers of a UE in accordance with a second embodiment of the present invention.

FIG. 9 illustrates procedures of setting transmit powers of physical layers of a UE in accordance with the second embodiment of the present invention.

Referring to FIG. 9, in step 621, a UE detects a transmission request of E-DPDCH/DPDCH/DPCCH data, comprising gain factors of the respective channels. In step 622, the UE having detected the transmission request estimates total transmit power $P_{tx}$ using the gain factors of the channels to be transmitted. That is, the UE measures its transmit power in every time slot in order to check its power condition. The UE estimates the total transmit power $P_{tx}$ of channels to be transmitted based on the measured transmit power and using given gain factors required for next transmission.

The UE checks if the total transmit power $P_{tx}$ exceeds the maximum allowed power $P_{max}$ in step 622. If the total transmit power does not exceed the maximum allowed power, the UE proceeds to step 626 to transmit the data through each relevant channel while using the gain factors.

If the total transmit power exceeds the maximum allowed power, the UE checks whether E-DCH data to be transmitted through the E-DPDCH corresponds to initial transmission data or retransmission data. If the E-DCH data is determined to be initially transmitted, the UE equally scales powers of all the channels while keeping power ratios between the channels constant in step 624. In another embodiment, the UE may defer transmission of a channel having lower priority according to priorities of the DCH-data and the E-DCH data and select gain factors in a conventional manner for the other channels or may set transmit power for an channel having higher priority before anything else and then set powers for the other channels such that the total transmit power does not exceed the maximum allowed power.

If the E-DCH data is to be retransmitted, the UE derives the gain factor of the E-DPDCH again and scales only the power of the E-DPDCH in step 625. At this time, the gain factor is reduced by a predetermined gain offset as shown in Equation (2). After the completion of step 624 or 625, the UE proceeds to step 626 to transmit the relevant data through the channels using the gain factor of the E-DPDCH and the gain factors of the other channels.

A transmitter unit of the UE according to the second embodiment is similar to that shown in FIG. 8 and thus will be described with reference to FIG. 8. Here, since the transmitter unit has the same construction as that in FIG. 8 except for the physical channel transmission controller 706, the HARQ controller 726 and the rate matcher 710, a detailed description of the overall transmitter unit will be omitted.

The physical channel transmission controller 706 functions to reset the gain factor of the E-DPDCH and set parameters necessary for physical channel transmission. To be specific, when the total transmit power $P_{tx,ori}$ exceeds the maximum allowed power $P_{max}$, the physical channel transmission controller 706 derives the new gain factor $\beta_e$ using information 702 representing initial transmission/retransmission received from the HARQ controller 726, power parameters $P_{max}$, $P_{tx,ori}$ 704 and gain factors $\beta_{e,ori}$, $\beta_c$, $\beta_d$ 705 received from the TFC selector 701 according to the procedures shown in FIG. 7.

When the total transmit power still exceeds the maximum allowed power even after the gain factor of the E-DPDCH has been scaled, transmit powers of the other channels are scaled-down while power ratios between the channels are kept constant. Also, in a case where information representing that a power ratio of the E-DPDCH has been scaled is required in view of a receiver structure of a Node B scheduler, the UE may signal information indicating that the power ratio off the E-DPDCH has been scaled to the Node B by physical layer signaling. In this case, the physical layer signaling for indicating that the power ratio of the E-DPDCH has been scaled may be performed using a 1-bit or 2-bit identifier as described in the first embodiment of the present invention.

EXAMPLE 3

In a third embodiment of the present invention, a UE scales powers of the entire channels by selecting a gain factor of an E-DPDCH such that total transmit power does not exceed the maximum allowed power in consideration of retransmission. According to this third embodiment of the present invention, a gain factor is selected in a different manner from that of initial setting in TFC selection procedures when a DCH occurs at a point of time of retransmission differently from at initial transmission.

In particular, the UE checks transmit power on a slot unit basis for a plurality of channels to be transmitted and reduces the transmit power of a specific channel step by step according to priorities of the channels. The priority may be determined by whether the relevant channel is a channel, retransmission of which is ensured, a control channel or the like.

To facilitate understanding of this embodiment, an exemplary transmission environment will be described first.

In a transmission environment according to this embodiment, one DCH and one E-DCH are set simultaneously and a possible TFC of each channel is set as shown below in Tables 5 and 6. Since the DCH is one, the TFC actually comprises a TF Set (TFS) comprising TFs and the TF of the E-DCH is designated by E-TF in Table 6. As shown in Tables 5 and 6, the larger index value TFs have, the more data they can transmit. Tables 5 and 6 assume that the DCH and the E-DCH are mapped to and transmitted through different physical channels from each other. If the DCH and the E-DCH are mapped to and transmitted through the same physical channel, gain factors are set according to the respective TFCs.

For the purpose of conciseness, scheduling operations necessary for the E-DCH will not be described and it is assumed that resources are so assigned as to enable the E-DCH to be transmitted in this embodiment.

When the DCH and the E-DCH are mapped to different physical channels from each other, total transmit power available to a UE becomes the sum of transmit powers of all physical channels and thus the UE sets a transmittable TFC in consideration of the transmit powers of the physical channels.

TABLE 5

Example of TF setting of DCH

| TFI | TF | Gain factor |
|-----|-------|-------------|
| 0 | 0x100 | beta0 |
| 1 | 1x100 | beta1 |
| 2 | 2x100 | beta2 |
| 3 | 3x100 | beta3 |

TABLE 6

Example of TF setting of E-DCH

| TFI | E-TF | Gain factor |
|-----|-------|-------------|
| 0 | 0x300 | beta4 |
| 1 | 1x300 | beta5 |
| 2 | 2x300 | beta6 |

If E-DCH data to be retransmitted exists, the UE sets the same E-TF as that of the initial transmission because there may occur a case where the DCH has a higher priority than the E-DCH at the time of retransmission and thus the same E-TF as that at the initial transmission is no selected. Such a case may arise due to channel conditions or scheduling.

Hereinafter a detailed description will be given for this embodiment.

The UE compares an E-TF of initial transmission with an E-TF of retransmission. If a result of comparison proves that an E-TF index of initial transmission is smaller than or equal to that of retransmission, the UE determines that it is possible to sufficiently support the E-TF of initial transmission, and selects the E-TF of initial transmission and a gain factor corresponding thereto. However, if the E-TF index of initial transmission is larger than that of retransmission, the UE selects the same E-TF as that of initial transmission and a new gain factor scaled for transmission. An example of setting a gain factor according to Table 6 is shown below in Table 7.

TABLE 7

Example of setting gain factor in Example 3

| | Initial transmission | TF of E-DCH transmittable at time point of retransmission | Final result of TFC selection at retransmission |
|---|---|---|---|
| E-TF | 2 | 1 | 2 |
| Gain factor | beta6 | beta5 | beta5 |

Referring to Tables 6 and 7, if an E-TF=2 is selected at initial transmission, the UE transmits (2×300)-bit data using gain factor=beta6. If DCH-data exists and thus the amount of data which the UE can transmit through the E-DCH is limited to an E-TF=1 at a point of time of retransmission, the UE selects a TFC for the DCH from among allowable TFCs and selects an E-TF of the E-DCH which can be transmitted using the remaining power, as a result of which an E-TF=1 and a gain factor=beta5 are selected. Since the E-TF=2 of initial transmission is larger than the E-TF=1 of retransmission, an E-TF_new=2 and a gain factor=beta5 are selected for the E-DCH at retransmission.

Hereinafter, a description will be given for a process of selecting a TFC in the above-mentioned channel setting environment according to the third embodiment of the present invention with reference to FIG. 10. In this embodiment, it is assumed that a TTI of a DCH is the same as that of an E-DCH and thus TFC selection can be always performed at the same point of time. If points of time of TFC selection for the DCH and the E-DCH are different from each other or it is impossible to perform TFC selection at the same point of time because TTIs of both the channels are different from each other, TFC selection for a channel having higher priority is performed first and then TFCs are selected for the other channels using the remaining power.

Figure 10:
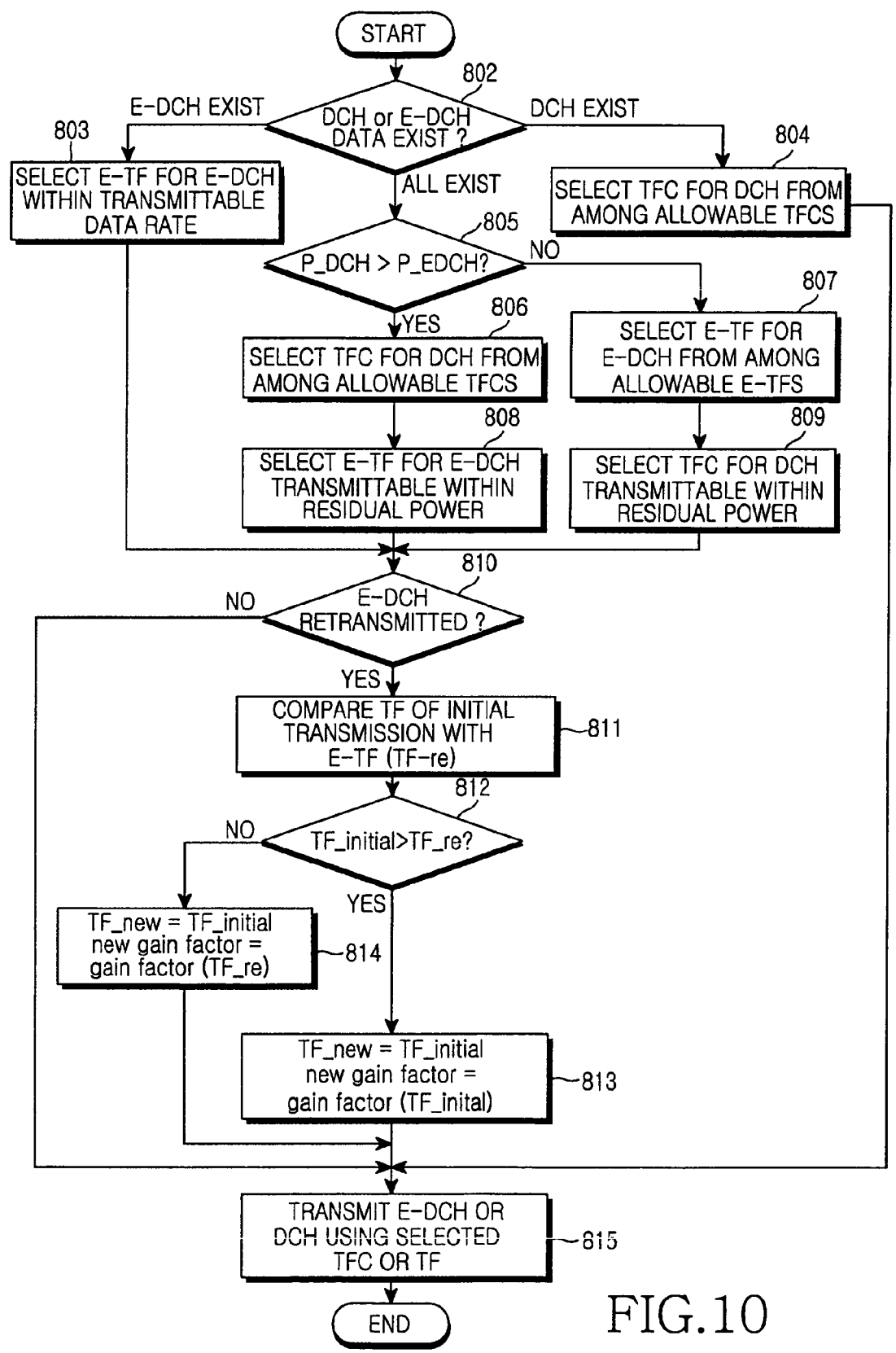
FIG. 10 is a flowchart illustrating procedures of selecting a Transport Format Combination (TFC) in accordance with a third embodiment of the present invention.

FIG. 10 illustrates procedures of selecting a TFC in accordance with the third embodiment of the present invention.

Referring to FIG. 10, in step 802, a UE checks if DCH data and E-DCH data exist.

If the checking proves that only the DCH data exists, the UE selects a TFC for the DCH from among allowable TFCs through an ordinary TFC selection process in step 804. If only the E-DCH data exists, the UE selects an E-TF of the E-DCH within an transmittable data rate in step 803.

If the checking proves that both the DCH and E-DCH data exist, the UE compares the priority of the E-DCH (P_EDCH) with that of the DCH (P_DCH) in step 805.

If the comparison proves that the priority of the DCH (P-DCH) is greater than that of the E-DCH, the UE selects first a TFC necessary for transmission of the DCH data from among allowable TFCs in step 806, proceeds to step 808 to select an E-TF for transmitting data through the E-DCH within the remaining power exclusive of the power which has been allocated to the TFC selected for the DCH, and then proceeds to step 810.

On the contrary, if the priority of the E-DCH (P_EDCH) is higher than that of the DCH, the UE selects first an E-TF for the E-DCH from among allowable E-TFs in step 807, proceeds to step 809 to select a TFC for transmission of the DCH data within remaining power exclusive of power which has been allocated to the E-TF selected for the E-DCH, and then proceeds to step 810. In another embodiment, when both the E-DCH data and the DCH data exist, the UE may defer transmission of one channel according to priorities of the two channels, select a TF for the other channel in a conventional manner, and then proceed to step 815.

In step 810, the UE determines whether the E-DCH data is to be initially transmitted or retransmitted. If the E-DCH data is determined to be initially transmitted, the UE transmits the E-DCH data through the selected E-TF in step 815. In contrast with this, if the E-DCH data is determined to be retransmitted, the UE proceeds to step 811 to compare an E-TF (TF_initial) selected at initial transmission with the E-TF (i.e., TF_re) selected in step 803, 807 or 808.

If an index of the initial transmission E-TF (TF_initial) is smaller than or equal to that of the retransmission E-TF (TF-re) in step 812, the UE selects the initial transmission E-TF (TF-initial) and a gain factor (gain factor (TF_initial)) corresponding thereto in step 813. In contrast with this, if the index of the initial transmission E-TF (TF_initial) is larger than that of the retransmission E-TF (TF-re), the UE selects the initial transmission E-TF as a new TF (TF_new) and selects a gain factor (gain factor (TF_re)) of the retransmission E-TF as a new gain factor in step 814. Afterward, in step 815, the UE transmits the DCH data and the E-DCH data using the E-TF, the TFC and the gain factors which have been selected in steps 802 to 814, respectively.

Figure 11:
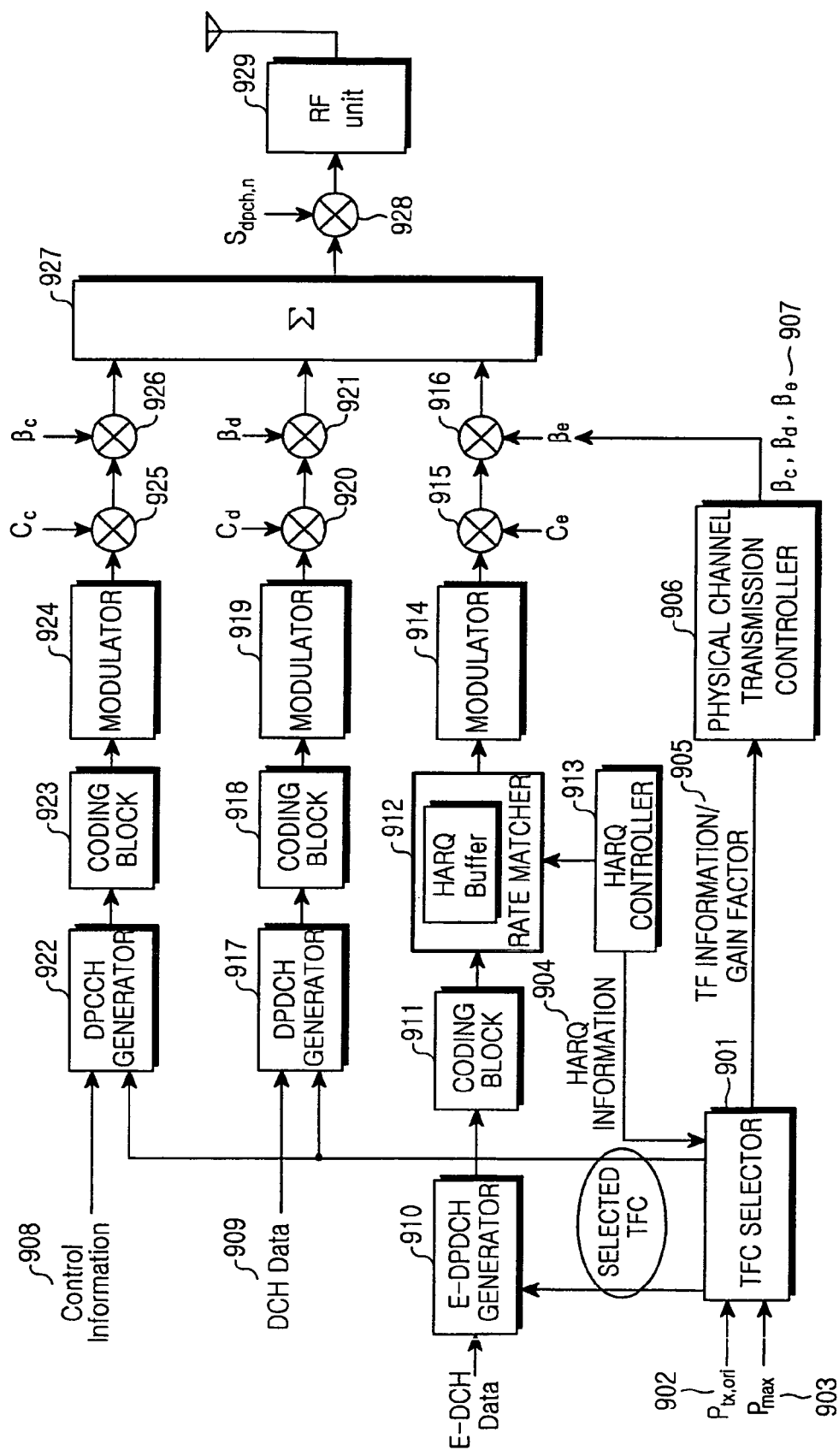
FIG. 11 is a block diagram illustrating a transmitter unit of a UE in accordance with the third embodiment of the present invention.

FIG. 11 illustrates a transmitter unit of a UE in accordance with the third embodiment of the present invention. Here, the UE uses a DPCCH, a DPDCH, an E-DPDCH and an E-DPCCH as uplink channels. However, a construction related to the E-DPCCH is omitted for convenience of explanation.

Referring to FIG. 11, a TFC selector 901 determines TFs of the channels. The TFC selector 901 is supplied with estimated total transmit power $P_{tx}$ information 902 and maximum allowed power $P_{max}$ information 903, and receives HARQ information 904 representing initial transmission/retransmission from an HARQ controller 913. The TFC selector 901 performs the procedures shown in FIG. 10 to determine a TFC, an E-TF and gain factors, and transmits information 905 on the determined TFC, E-TF and gain factors to a physical channel transmission controller 906. The physical channel transmission controller 906 sets the gain factors 907 to gain scalers 926, 921, 916 corresponding to the relevant channels.

If a DCH, that is, control information 908 for the DPDCH is received, a DPCCH generator 922 generates the control information 908 into a DPCCH frame, and a coding block 923 encodes the DPCCH frame. The encoded data is modulated by a modulator 924, is spread by a channelization code $C_c$ of the DPCCH in a spreader 925, is multiplied by a gain factor $\beta_c$ of the DPCCH in the gain scaler 926, and then is transmitted to a multiplexer 927.

If data 909 to be transmitted through the DCH and the E-DCH is received, an E-DPDCH generator 910 and a DPDCH generator 917 generate the data 909 into a DPDCH frame and an E-DPDCH frame according to TFC information selected TF by TF in the TFC selector 901, respectively, and coding blocks 918, 911 encode the DPDCH frame and the E-DPDCH frame, respectively. The DPDCH data encoded in the coding block 918 is modulated by a modulator 919, is delivered to a spreader 920 to be spread by a channelization code $C_d$ of the DPDCH, is multiplied by a gain factor $\beta_d$ of the DPDCH in the gain scaler 921, and then is transmitted to the multiplexer 927.

The E-DPDCH data encoded in a coding block 911 is transmitted to a rate matcher 912. The rate matcher 912 performs rate matching of the encoded E-DPDCH data under the control of the HARQ controller 913. The rate-matched data is modulated by a modulator 914, is spread by a channelization code $C_e$ of the E-DPDCH in a spreader 915, is multiplied by the gain factor $\beta_e$ of the E-DPDCH set by the physical channel transmission controller 906 in a gain scaler 916, and then is transmitted to the multiplexer 927.

The data from the gain scalers 926, 921, 916 are multiplexed in the multiplexer 927, is input into a scrambler 928 to be scrambled by a scrambling code $S_{dpch,n}$, and then is RF-converted and transmitted through an RF unit 929.

EXAMPLE 4

In a fourth embodiment of the present invention, the transmit power of an E-DPDCH is preferentially reduced when the total transmit power of an UE exceeds the maximum allowed power. According to this fourth embodiment of the present invention, the UE performs an operation for recalculating a gain factor of an E-DCH such that the total transmit power does not exceed the maximum allowed power every unit of power control, that is, on a slot-by-slot basis, and resets the gain factor of the E-DCH anytime irrespective of whether E-DCH data is initially transmitted or retransmitted when the total transmit power exceeds the maximum allowed power. This is because the total transmit power of the UE is controlled by a Transmit Power Control (TPC) command which is received from a Node B from slot to slot. Specifically, the TPC command is applied to power adjustment of a DPCCH. Since a power ratio of a DPDCH/E-DPDCH/E-DPCCH relative to the DPDCH is maintained by a gain factor of the relevant channel, the TPC command is related to the total transmit power of the UE.

Figure 12:
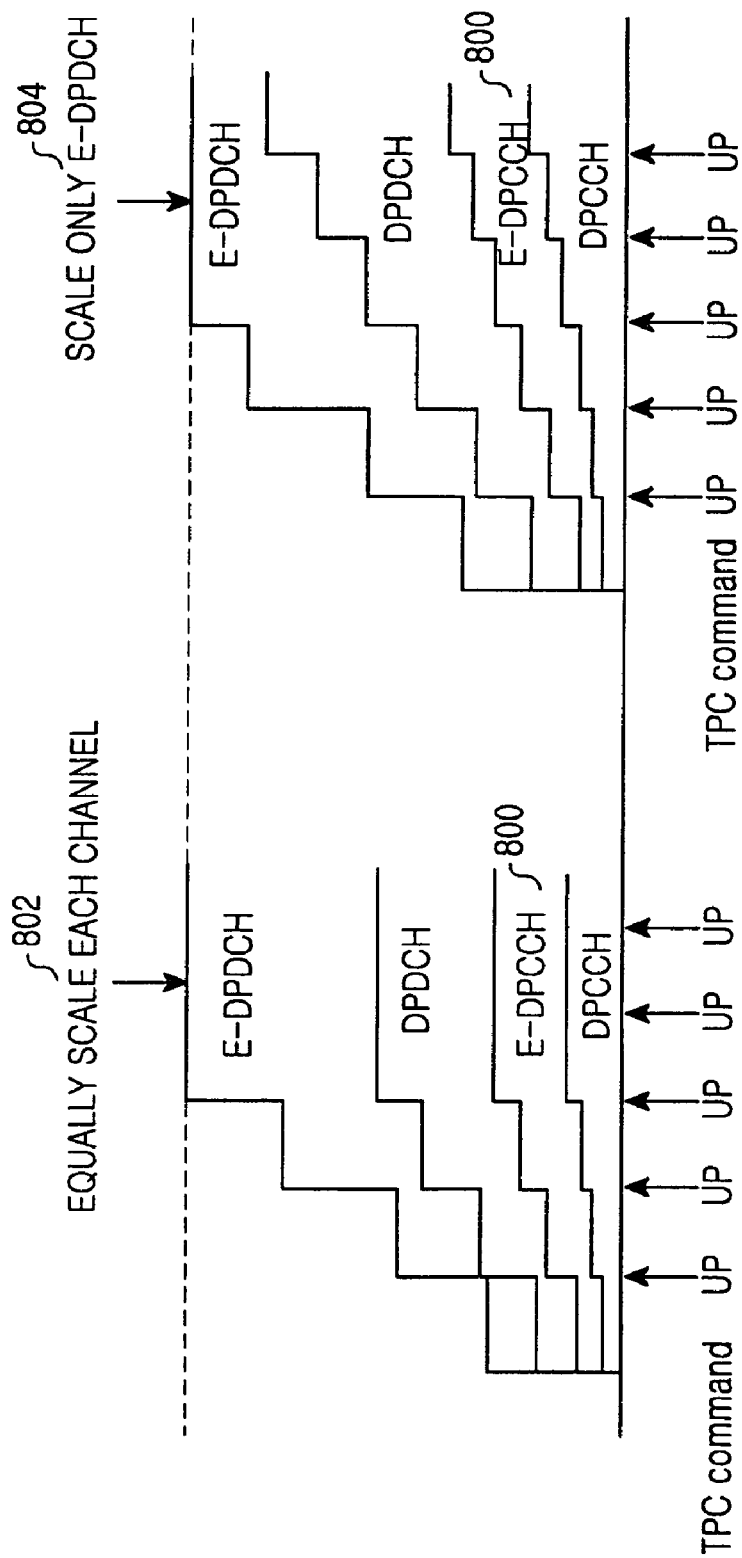
FIG. 12 is a diagram illustrating power setting of a UE in accordance with a fourth embodiment of the present invention as compared with a prior art.

FIG. 12 illustrates an example in which whether or not total transmit power exceeds the maximum allowed power is checked on a slot-by-slot basis and only the transmit power of an E-DPDCH, to which an E-DCH is mapped, is scaled when the total transmit power exceeds the maximum allowed power. Since an E-DPCCH carries control information for demodulating and decoding the E-DPDCH, its reliability must be ensured. Thus, a power ratio 800 of the E-DPCCH is maintained even when the transmit power of the E-DPDCH is scaled.

Referring to FIG. 12, a TPC command continues to indicate power-up (UP) within one TTI, so that total transmit power exceeds the maximum allowed power. Reference numeral '802' designates transmit power setting according to a prior art, in which if the total transmit power reaches the maximum allowed power, transmit powers of all channels are equally scaled down in spite of the TPC command continuing to indicate UP. Reference numeral '804' designates transmit power setting according to the fourth embodiment of the present invention, in which if the TPS command indicating UP is continually received after the total transmit power has reached the maximum allowed power, only the transmit power of an E-DPDCH is scaled down and transmit powers of the other channels (DPDCH/E-DPCCH/DPCCH) are equally scaled up while predetermined power ratios are maintained.

When the transmit power of the E-DPDCH is scaled down, but still the total transmit power still exceeds the maximum allowed power, the operation of scaling the transmit power of the E-DPDCH may be repeated. At this time, when the transmit power of the E-DCPDCH becomes a predetermined minimum value, for example, 0, the E-DPDCH is not transmitted. Nevertheless, if the total transmit power still exceeds the maximum allowed power, transmit powers of the other respective channels are scaled-down while power ratios of the channels are maintained.

Hereinafter, a detailed description will be given for procedures of setting transmit power of a UE in accordance with the fourth embodiment of the present invention with reference to FIG. 13.

Figure 13:
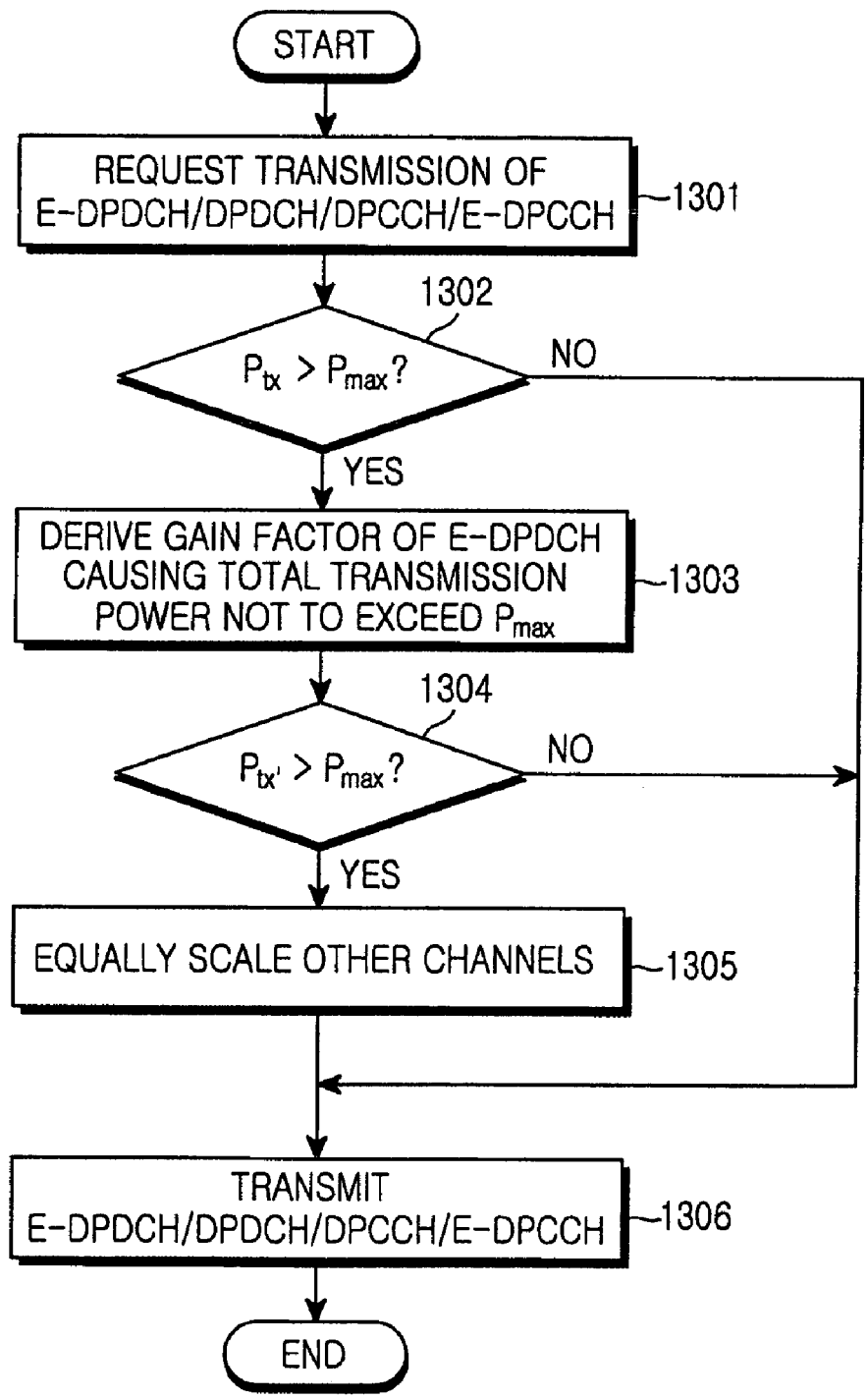
FIG. 13 is a flowchart illustrating procedures of setting power of a UE in accordance with the fourth embodiment of the present invention.

Referring to FIG. 13, in step 1301, a physical layer of a UE checks if the transmission time of an E-DPDCH, a DPDCH, a DPCCH or an E-DPCCH has arrived from each slot. If the transmission time of the physical channels has arrived, the UE compares total transmit power $P_{tx}$ of the physical channels with the predetermined maximum allowed power $P_{max}$. Here, the total transmit power is transmit power which is estimated according to a TPC command received from a Node B.

If a result of comparison proves that the total transmit power $P_{tx}$ exceeds the maximum allowed power $P_{max}$, the UE proceeds to step 1303. At this time, $P_{tx}$ becomes $P_{tx,ori}$ in Equation (1). The UE derives a gain factor of the E-DPDCH which causes the total transmit power $P_{tx}$ not to exceed the maximum allowed power $P_{max}$. Such a gain factor can be derived in the same manner as that presented in Equation (1). As another example, the UE may reduce the gain factor of the E-DPDCH by a predetermined gain offset as in Equation (2). The gain factor is derived, and then the UE proceeds to step 1304.

In step 1304, the UE compares again the total transmit power to which the derived gain factor is applied with the maximum allowed power. At this time, $P_{tx}'$ signifies total transmit power to which the new $\beta_e$ derived in step 1303 is applied. If the total transmit power still exceeds the maximum allowed power, the UE proceeds to step 1305. Here, in a case of using Equation (2), the UE may repeat step 1303 while decreasing the gain factor of the E-DPDCH step by step until the total transmit power does not exceed the maximum allowed power.

If a result of comparison in step 1304 proves that the transmit power of the E-DPDCH, that is, updated transmit power to which the gain factor calculated in step 1303 is applied becomes a possible minimum value, for example, 0 and so the E-DPDCH cannot be transmitted, but still the total transmit power exceeds the maximum allowed power, this may be regarded as a situation where the UE is short of power resources and the UE proceeds to step 1305. In step 1305, gain factors of the other channels (E-DPCCH/DPDCHJD-PCCH) are derived such that the total transmit power can be reduced while power ratios of the other channels are maintained. That is, in step 1305, power ratios between the DPCCH and the E-DPCCH, between the DPCCH and the DPDCH, and between the DPCCH and the E-DPCCH remains constant. The above-mentioned steps are performed every slot. Since the E-DPCCH is transmitted while maintaining its reliability even in a slot in which the E-DPDCH is not transmitted, the E-DPCCH is transmitted with transmit power which is reduced on the same scale of that of other channels.

In step 1306, the UE transmits E-DPDCH/DPDCH/DPCCH/E-DPCCH data with transmit powers according to the derived gain factors.

Figure 14:
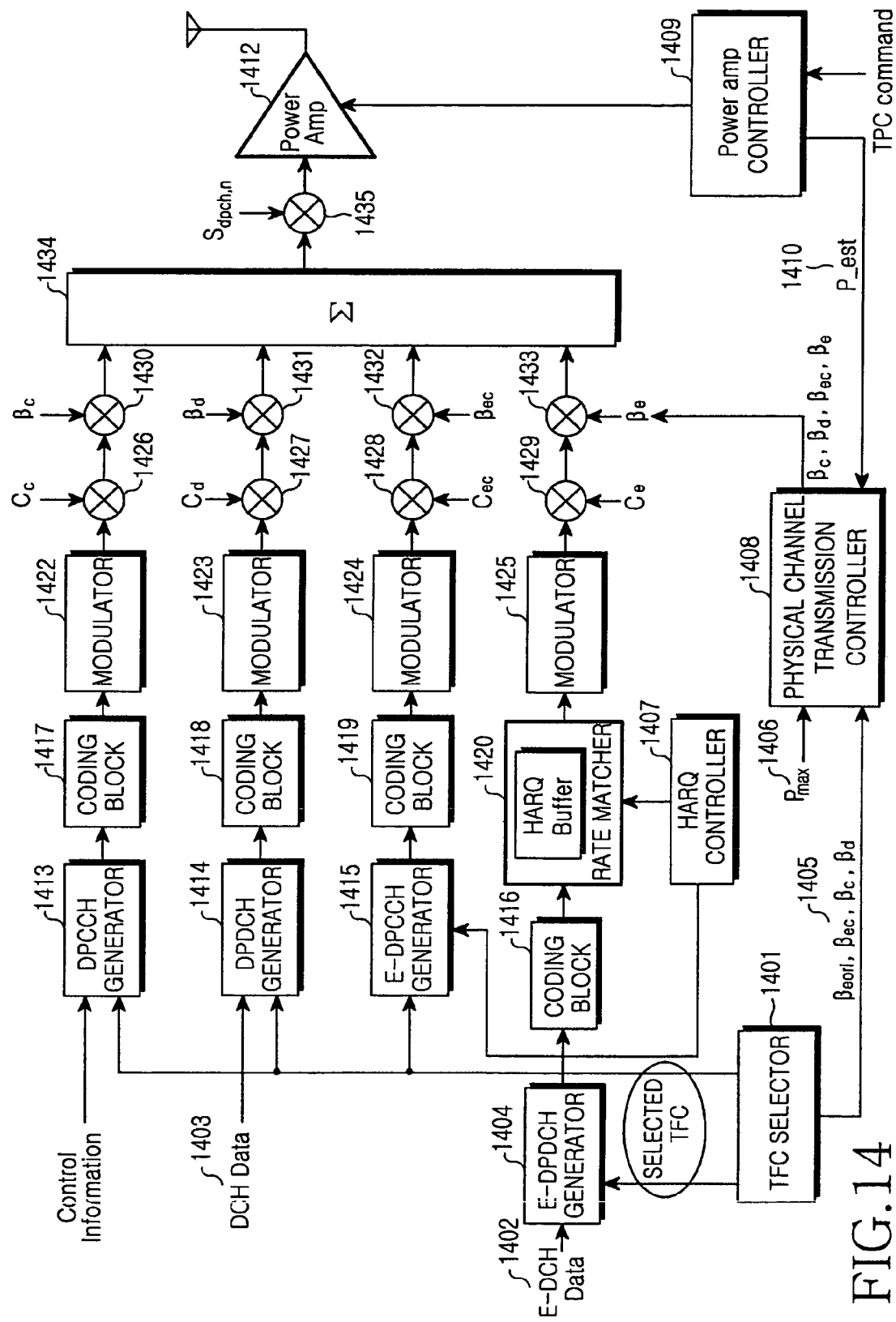
FIG. 14 is a block diagram illustrating an example of a transmitter unit of a UE in accordance with the fourth embodiment of the present invention.

FIG. 14 illustrates a transmitter unit of a UE in accordance with the fourth embodiment of the present invention. In FIG. 14, the transmitter unit is constructed such that the UE performs DPDCH/DPCCH/E-DPDCH/E-DPCCH transmission. In the transmitter unit, the same parts as those explained in connection with FIGS. 8 and 11, that is, DPCCH/DPDCH/E-DPDCH generators 1413, 1414, 1415, 1404, rate matcher 1420, HARQ controller 1407, coding blocks 1417, 1418, 1419, 1416, modulators 1422, 1423, 1424, 1425, spreaders 1426, 1427, 1428, 1429, gain scalers 1430, 1431, 1432, 1433, a channel multiplexer 1434 and a scrambler 1435 will not be described and only parts directly related to the fourth embodiment of the present invention will be described below.

A TFC selector 1401 selects TFC for E-DCH data (1402) and DCH data (1403), and delivers gain factors 1405 corresponding to the TFC, that is, $\beta_{e,ori}$, $\beta_{ec}$, $\beta_c$ and $\beta_d$ to a physical channel transmission controller 1408. The physical channel transmission controller 1408 also receives information on the maximum allowed power 1405. A power amp controller 1409 controls a power amp 1412 using power offset $P_{offset}$ according to a TPC command received from a Node B every slot, and delivers estimated transmit power (P_est) 1410, which is estimated according to the TPC command, as total transmit power $P_{tx}$ to the physical channel transmission controller 1408. The physical channel transmission controller 1408 resets the gain factors of the respective channels using the total transmit power 1410 according to the procedures in FIG.

13, and provided the reset gain factors $\beta_c$, $\beta_d$, $\beta_{ec}$ and $\beta_e$ to the gain scalers 1430, 1431, 1432, 1433.

In the fourth embodiment of the present invention, the transmit power P_est is provided from the power amp controller 1409 every slot when the gain factor of the E-DPDCH is recalculated slot by slot such that the total transmit power does not exceed the maximum allowed power. However, in view of a structure of the UE in which a RF unit is partitioned from a modem, it may be impossible that the physical channel transmission controller 1408 is provided with the total transmit power from the power amp controller 1409 every slot.

Figure 15:
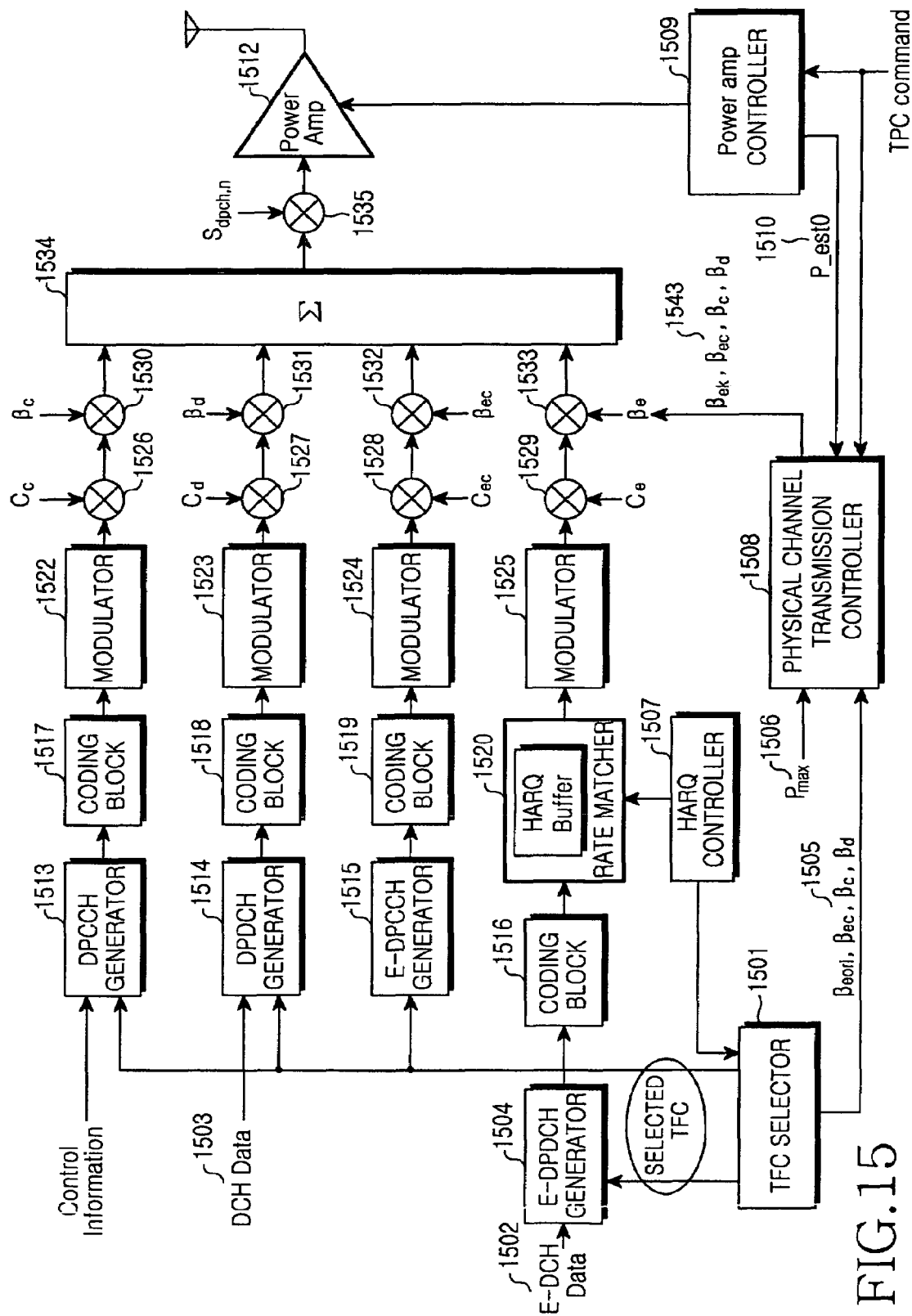
FIG. 15 is a block diagram illustrating another example of a transmitter unit of a UE in accordance with the fourth embodiment of the present invention.

Therefore, to solve such a problem, another example of a transmitter unit according to the fourth embodiment of the present invention is shown in FIG. 15.

In this modified fourth embodiment, a power amp controller 1509 delivers P_est to a physical channel transmission controller 1508 not every slot but every predetermined specific slot. In this case, since the physical channel transmission controller 1508 cannot exactly know P_est in the other slots except the specific slot, it estimates all possible P_est values for the specific slot and the other slots, and calculates gain factors of the E-DPDCH for the estimated P_est values. Here, the P_est values of the other slots is derived by adding or subtracting a power control unit value according to a TPC (hereinafter referred to as 'Delta') to or from the P_est value of the specific slot.

To give an example, in a case where P-est is delivered every two slots, gain factors to be estimated are as follows:

$1^{st}$ slot: P_est0 $\Rightarrow \beta_{e0}$ $2^{nd}$ slot: When TPC UP is received, P_est1_up=P_est0+ Delta $\Rightarrow \beta_{e1\_up}$ When TPC DOWN is received, P_est1_down=P_est0− Delta $\Rightarrow \beta_{e1\_down}$ In the above example, the UE is received P_est0 every two slots and performs the procedures in FIG. 13 based on the P_est0 to calculate a gain factor of the E-DPDCH $\beta_{e0}$, and then calculate a gain factor for a next slot according to estimated total transmit power $\beta_{e1}$ of the next slot. At this time, for the cases where a TPC command of UP is received and a TPC command of DOWN is received, $\beta_{e1\_up}$ and $\beta_{e1\_down}$ are all derived.

In this manner, the physical channel transmission controller 1508 previously calculates three $\beta_e$ values, and selects and applies one of the three $\beta_e$ values based on the received TPC command in each slot.

In a case where P_est0 is delivered from the power amp controller 1509 every 'K' slots, the number M of estimated gain factors of the other slots becomes $2^{(K-1)}$.

In FIG. 15, the same parts as those explained in connection with FIGS. 8 and 11, that is, DPCCH/DPDCH/E-DPDCH generators 1513, 1514, 1515, 1504, rate matcher 1520, HARQ controller 1507, coding blocks 1517, 1518, 1519, 1516, modulators 1522, 1523, 1524, 1525, spreaders 1526, 1527, 1528, 1529, gain scalers 1530, 1531, 1532, 1533, a channel multiplexer 1534 and a scrambler 1535 will not be described and only parts directly related to the modified fourth embodiment of the present invention will be described below.

A TFC selector 1501 selects TFC for E-DCH data 1502 and DCH data 1503, and delivers gain factors 1505 corresponding to the TFC, that is, $\beta_{e,ori}$, $\beta_{ec}$, $\beta_c$ to a physical channel transmission controller 1508. The physical channel transmission controller 1508 also receives information on the maximum allowed power ($P_{max}$) 1506. A power amp controller 1509 controls a power amp 1512 according to a TPC command received from a Node B every slot, and delivers estimated total transmit power (P_est0) 1510, which is estimated according to the TPC command, to the physical channel transmission controller 1508 in a predetermined specific slot.

The physical channel transmission controller 1508 receives the P_est0 1510 at the specific slot to derive gain factors 1543 of the respective channels and provide them to the gain scalers 1530, 1531, 1532, 1533. In particular, the physical channel transmission controller 1508 estimates possible P_estk_up/down (k=1, 2, . . . , $2^{(K-1)}$) for the other slots exclusive of the specific slot and calculates all possible gain factors of the E-DPDCH $\beta_{ek\_up}$, $\beta_{ek\_down}$ for the estimated P_estk_up/down. After has calculated all the possible gain factors, the physical channel transmission controller 1508 receives a TPC command every k-th slot following the specific slot to deliver the corresponding gain factor $\beta_{ek\_up}$ or $\beta_{ek\_down}$ to the gain scaler 1533 of the E-DPDCH. Transmit powers of the other channels except the E-DPDCH may be equally scaled by the power amp 1512.

EXAMPLE 5

In a fifth embodiment of the present invention, when the total transmit power of a UE exceeds the maximum allowed power, the power of an E-DPDCH is preferentially reduced and then powers of the other channels are successively reduced in the order from lower channel priority to higher channel priority.

It is assumed that a DPDCH, a DPCCH, an E-DPDCH and an E-DPCCH exist. To set channel-by-channel priority, whether or not the relevant channel supports retransmission is considered first and then whether or not the relevant channel is a control channel is considered. In this case, the channel-by-channel priority may be set in the order of DPCCH/E-DPCCH/DPDCH/E-DPDCH. Also, when whether or not the relevant channel is a control channel is considered first and then whether or not the relevant channel supports retransmission is considered is considered, the channel-by-channel priority may be set in the order of DPCCH/DPDCH/E-DPCCH/E-DPDCH.

Hereinafter, by way of example, a description will be given for a case where the channel-by-channel priority is set in the order of DPCCH/E-DPCCH/DPDCH/E-DPDCH. When total transmit power of a UE exceeds the maximum allowed power, the UE adjusts transmit power of the E-DPDCH having the lowest priority using a gain factor or a power offset value and does not perform power adjustment for the other channel.

When the transmit power of the E-DPDCH is set to a predetermined minimum value, e.g., 0, but still the total transmit power of the UE exceeds the maximum allowed power, transmit power of the E-DPCCH is adjusted and power adjustment is not performed for the other channels. At this time, since the E-DPCCH carries control information indispensable for demodulation and decoding of the E-DPDCH, the E-DPCCH is adjusted such that predetermined minimum power (not 0) for the E-DPCCH is maintained. Similarly, if the total transmit power of the UE still exceeds the maximum allowed power although the transmit power of the E-DPCCH is set as the minimum power, power adjustments are successively performed for the other channels, that is, the DPCCH and the DPDCH such that their predetermined minimum powers are maintained.

EXAMPLE 6

In a sixth embodiment of the present invention, when checking for total transmit power of a UE proves that the total transmit power exceeds the maximum allowed power, transmit power of an E-DPDCH is scaled down in the unit of a minimum TTI. The transmit power of the E-DPDCH can be scaled down by scaling a gain factor of the E-DPDCH.

Although the transmit power of the E-DPDCH has been scaled down in the unit of a minimum TTI, the total transmit power may exceed the maximum allowed power due to power control occurring in the unit of a slot. In this case, transmit powers of all channels are equally scaled down such that the total transmit power does not exceed the maximum allowed power while power ratios between the channels are maintained. Here, the channels comprise the E-DPDCH and signifies a DPDCH, a DPCCH, an E-DPCCH and the like.

Specifically, when an E-DPDCH is set at a TTI of 2 ms or 10 ms and a DPDCH which is transmitted at a TTI of 10 ms or more exists, a UE checks total transmit power in the unit of a minimum TTI of the E-DPDCH, that is, in the unit of 2 ms and scales transmit power of the E-DPDCH in the unit of 2 ms. If 15 slots exist in a TTI of 10 ms and 3 slots exist in a TTI of 2 ms, the UE scales the transmit power of the E-DPDCH in the unit of 2 ms and then scales the total transmit power in the unit of each slot in consideration of power control.

Detailed procedures performed by the UE which operates as stated above are the same as in the fourth embodiment, but it is preferred that a cycle of performing the operation is set in the unit of a minimum TTI, in particular, a minimum TTI of an E-DPDCH, instead of in the unit of a slot.

As described above, when data transmitted through a DCH occurs during a packet service through an E-DCH and thus total transmit power exceeds the maximum allowed power, a method and an apparatus according to this embodiment of the present invention scales down only the transmit power of an E-DPDCH having lower priority, thereby ensuring transmission qualities of other channels having higher priority and making it possible to efficiently use transmit power of an UE.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for transmitting data of a first channel not supporting Hybrid Automatic Retransmission Request (HARQ) and a second channel supporting the HARQ in a mobile telecommunication system which supports an enhanced uplink service, the method comprising the steps of:
    determining transmit power factors for the channels and determining if total transmit power required for transmission of the channels exceeds the maximum allowed power;
    scaling-down the transmit power factor for the second channel if the total transmit power exceeds the maximum allowed power; and
    transmitting data through the first and second channels using the scaled-down transmit power factor for the second channel and the transmit power factor for the first channel.

2. The method as claimed in claim 1, wherein the scaling step is performed on a slot-by-slot basis.

3. The method as claimed in claim 1, wherein the total transmit power is determined based on the transmit power factors for the first and second channels and a Transmit Power Control (TPC) command issued by the system.

4. The method as claimed in claim 1, further comprising the step of equally scaling transmit power factors corresponding to the other channels comprising the first channel when the transmit power factor for the second channel is scaled down below a predetermined minimum value.

5. The method as claimed in claim 4, wherein the predetermined minimum value indicates a status where the second channel is not transmitted.

6. The method as claimed in claim 1, further comprising the step of equally scaling transmit power factors for the other channels exclusive of the second channel if the total transmit power still exceeds the maximum allowed power even after the transmit power factor for the second channel has been scaled-down.

7. The method as claimed in claim 1, further comprising the step of successively scaling transmit power factors for the other channels exclusive of the second channel according to channel-by-channel priority if the total transmit power still exceeds the maximum allowed power even after the transmit power factor for the second channel has been scaled.

8. The method as claimed in claim 7, wherein the channel-by-channel priority is given such that a channel not supporting retransmission has relatively lower priority than that of a channel supporting retransmission, and a channel carrying data has relatively lower priority than that of a channel carrying control information.

9. The method as claimed in claim 1, wherein in the scaling step, the transmit power factor for the second channel is scaled when data of the second channel to be transmitted is retransmission data.

10. The method as claimed in claim 1, wherein when data of the second channel to be transmitted is initial transmission data, transmit power factors for all the channels comprising the second channel are equally scaled such that the total transmit power does not exceed the maximum allowed power.

11. The method as claimed in claim 1, wherein when data of the second channel to be transmitted is initial transmission data, transmit power factors for all the channels comprising the second channel is successively scaled according to predetermined channel-by-channel priority such that the total transmit power does not exceed the maximum allowed power.

12. The method as claimed in claim 11, wherein the channel-by-channel priority is given such that a channel not supporting retransmission has relatively lower priority than that of a channel supporting retransmission, and a channel carrying data has relatively lower priority than that of a channel carrying control information.

13. The method as claimed in claim 11, wherein the scaling step comprises the sub-steps of:
    acquiring total transmit power in a specific slot, the total transmit power being estimated according to a TPC command received from a Node B;
    deriving a first transmit power factor for the second channel, the first transmit power factor causing the estimated total transmit power not to exceed the maximum allowed power;
    providing the first transmit power factor as the scaled transmit power factor for the specific slot;
    deriving a total transmit power value increased by a predetermined power control unit value and a total transmit power value decreased by the predetermined power control unit value using the estimated total transmit power for at least a next slot following the specific slot, and deriving second transmit power factors for the second channel corresponding to the increased total transmit power value and the decreased total transmit power value, the second transmit power factors causing the increased total transmit power value and the decreased total transmit power value not to exceed the maximum allowed power, respectively;

receiving a TPC command in at least the next slot and selecting one of the second transmit power factors according to whether the received TPC command represents UP or DOWN; and providing the selected second transmit power factor as the scaled transmit power factor for at least the next slot.

14. The method as claimed in claim 1, wherein the transmit power factors are determined based on Transport Formats (TF) which are selected according to scheduling assignment information received from a Node B, respectively.

15. An apparatus for transmitting data of a first channel not supporting Hybrid Automatic Repeat reQuest (HARQ) and a second channel supporting the HARQ in a mobile telecommunication system which supports an enhanced uplink service, the apparatus comprising:

a controller for determining transmit power factors for the channels, determining if total transmit power required for transmission of the channels exceeds the maximum allowed power, and scaling down the transmit power factor for the second channel if the total transmit power exceeds the maximum allowed power;

first and second channel generators for generating first and second data frames by performing channel-coding and modulation of the first and second channel data; and a gain scaling unit for adjusting the transmit powers of the first and second channels, with which the data frames of the first and second channels is transmitted, using the scaled transit power factor for the second channel and the transmit power factor for the first channel.

16. The apparatus as claimed in claim 15, wherein the controller scales the transmit power factor for the second channel from slot to slot when the total transmit power exceeds the maximum allowed power.

17. The apparatus as claimed in claim 15, wherein the controller determines the total transmit power based on the transmit power factors for the first and second channels and a TPC command issued by the system.

18. The apparatus as claimed in claim 15, wherein the controller equally scales transmit power factors corresponding to the other channels comprising the first channel when the transmit power factor for the second channel is scaled-down below a predetermined minimum value.

19. The apparatus as claimed in claim 18, wherein the predetermined minimum value indicates a status where the second channel is not transmitted.

20. The apparatus as claimed in claim 15, wherein the controller equally scales transmit power factors for the other channels exclusive of the second channel if the total transmit power still exceeds the maximum allowed power even after the transmit power factor for the second channel has been scaled.

21. The apparatus as claimed in claim 15, wherein the controller successively scales transmit power factors for the other channels exclusive of the second channel according to channel-by-channel priority if the total transmit power still exceeds the maximum allowed power even after the transmit power factor for the second channel has been scaled.

22. The apparatus as claimed in claim 21, wherein the channel-by-channel priority is given such that a channel not supporting retransmission has relatively lower priority than that of a channel supporting retransmission, and a channel carrying data has relatively lower priority than that of a channel carrying control information.

23. The apparatus as claimed in claim 15, wherein the controller scales the transmit power factor for the second channel when data of the second channel to be transmitted is retransmission data.

24. The apparatus as claimed in claim 15, wherein when data of the second channel to be transmitted is initial transmission data, the controller equally scales transmit power factors for all the channels comprising the second channel such that the total transmit power does not exceed the maximum allowed power.

25. The apparatus as claimed in claim 15, wherein when data of the second channel to be transmitted is initial transmission data, the controller successively scales transmit power factors for all the channels comprising the second channel according to predetermined channel-by-channel priority such that the total transmit power does not exceed the maximum allowed power.

26. The apparatus as claimed in claim 25, wherein the channel-by-channel priority is given such that a channel not supporting retransmission has relatively lower priority than that of a channel supporting retransmission, and a channel carrying data has relatively lower priority than that of a channel carrying control information.

27. The apparatus as claimed in claim 15, wherein the controller acquires total transmit power, which is estimated according to a TPC command received from a Node B, in a specific slot, derives a first transmit power factor for the second channel, which causes the estimated total transmit power not to exceed the maximum allowed power, provides the first transmit power factor as the scaled transmit power factor for the specific slot, derives a total transmit power value increased by a predetermined power control unit value and a total transmit power value decreased by the predetermined power control unit value using the estimated total transmit power for at least a next slot following the specific slot, derives second transmit power factors for the second channel, which correspond to the increased total transmit power value and the decreased total transmit power value and cause the increased total transmit power value and the decreased total transmit power value not to exceed the maximum allowed power, respectively, receives a TPC command in at least the next slot, selects one of the second transmit power factors according to whether the received TPC command represents UP or DOWN, and provides the selected second transmit power factor as the scaled transmit power factor for at least the next slot.

28. The apparatus as claimed in claim 15, wherein the transmit power factors are determined based on Transport Formats (TF) which are selected according to scheduling assignment information received from a Node B, respectively.

* * * * *